US007542958B1

(12) United States Patent
Warren et al.

(10) Patent No.: US 7,542,958 B1
(45) Date of Patent: Jun. 2, 2009

(54) METHODS FOR DETERMINING THE SIMILARITY OF CONTENT AND STRUCTURING UNSTRUCTURED CONTENT FROM HETEROGENEOUS SOURCES

(75) Inventors: David S. Warren, Stony Brook, NY (US); Terrance L. Swift, Great Falls, VA (US); Tatyana Vidrevich, Port Jefferson, NJ (US); Iv Ramakrishnan, Setauket, NY (US); L. Robert Pokorny, Calverton, NY (US); Alex Beggs, Setauket, NY (US); Christopher Rued, East Setauket, NY (US); Michael Epstein, East Northport, NY (US); Harpreet Singh, Elmont, NY (US); Hasan Davulcu, Tempe, AZ (US)

(73) Assignee: XSB, Inc., Stony Brook, NY (US)

( * ) Notice: Subject to any disclaimer, the term of this patent is extended or adjusted under 35 U.S.C. 154(b) by 955 days.

(21) Appl. No.: 10/660,305

(22) Filed: Sep. 11, 2003
(Under 37 CFR 1.47)

Related U.S. Application Data

(60) Provisional application No. 60/410,684, filed on Sep. 13, 2002.

(51) Int. Cl.
*G06N 5/02* (2006.01)
*G06F 17/21* (2006.01)
(52) U.S. Cl. .......................................... 706/48; 706/61
(58) Field of Classification Search .................... 706/48, 706/61
See application file for complete search history.

(56) References Cited

U.S. PATENT DOCUMENTS 5,794,050 A * 8/1998 Dahlgren et al. ............. 717/144
6,076,088 A * 6/2000 Paik et al. ....................... 707/5
6,424,973 B1 * 7/2002 Baclawski ................... 707/102

OTHER PUBLICATIONS

Fonseca et al. (Fonseca), "Magui—A Multi-Agent Graphical User Interface", 1997.*
Wenyin, "Example-Driven Graphics Recognition", 2002.*
Embley, Ontology-Based Extraction and Structuring of Information from Data-Rich Unstructured Documents, 1998.*
Oracle, Oracle Express Web Agent User's Guide, 1999.*
Collis et al. (Collis), The Zeus Agent Building Toolkit ZEUS Technical Manual, Release 1.0, Sep. 1999.*
White Paper—A Layered Architecture for Querying Dynamic Web Content—Hasan Davulcu, Juliana Freire, Michael Kifer, I.V. Ramakrishnan—Published 1999.
White Paper—Extraction Techniques for Mining Services from Web Sources—Hasan Davulcu, Saikat Mukherjee, I. V. Ramakrishnan—Published 2002.

(Continued)

*Primary Examiner*—Joseph P Hirl
*Assistant Examiner*—Nathan H Brown, Jr.
(74) *Attorney, Agent, or Firm*—Thomas A Gallagher

(57) ABSTRACT

The invention includes methods and software tools for acquiring data from diverse sources, and structuring the data in a form that may be used to determine object equivalence. Practice of the invention includes one or more of the following tools: a data acquisition web agent creator, a web agent created by the web agent creator, an agent manager for deploying said web agent, and ontology-directed classifier, an ontology-directed extractor, and an ontology-directed matcher. The tools are example driven through a graphical user interface.

36 Claims, 17 Drawing Sheets

OTHER PUBLICATIONS

White Paper—Lixto Visual Wrapper—Published 2001.

White Paper—Visual Web Information Extraction with Lixto—Robert Baumgartner, Sergio Flesca, Georg Gottlob—Published 2001.

White Paper—Web Ecology: Recycling HTML pages as XML documents using W4F—Arnaud Sahuguet, Fabien Azavant—Published 1999.

White Paper—WysiWyg Web Wrapper Factory (W4F)—Arnaud Sahuguet, Fabien Azavant—Published 1999.

White Paper—XWRAP: An XML-Enabled Wrapper Construction System for Web Information Sources—Ling Liu, Calton Pu, Wei Han—Published 2000.

White Paper—RoboSuite Technical White Paper—Kapow Technologies—Published Aug. 2003.

White Paper—Web Information Modeling, Extraction, and Presentation—Zehua Liu, Feifei Li, Yangfeng Huang, Wee Keong Ng—Published 2002.

* cited by examiner

FIG. 3

| Path Extraction Editor | | | | |
|---|---|---|---|---|
| Attribute1 | Attribute2 | Attribute4 | Attribute5 | Attribute6 |
| | /mypss/intro... | | | |
| 15403 | /mypss/item... | Cath Female ERU Siliconized PVC 14 Fr 6.5" Single... | 2200051... | Rusch |
| 7913 | /mypss/item... | Cath Urethral Red Rubber 10 Fr 50/Cs | PRU110 | Allegiance |
| 4567 | /mypss/item... | Cath Urethral Red Rubber 12 Fr 16" 3 Opposed Eye... | 351012 | Rusch |
| 8320 | /mypss/item... | Cath Urethral Red Rubber 12 Fr 50/Cs | PRU112 | Allegiance |
| 1916 | /mypss/item... | Cath Urethral Red Rubber 14 Fr 16" 4 Opposed Eye... | 351014 | Rusch |
| 8111 | /mypss/item... | Cath Urethral Red Rubber 14 Fr 16" Round Hollow... | 177714 | Bard |
| 1233 | /mypss/item... | Cath Urethral Red Rubber 14 Fr 16" Round Hollow... | 0094140 | Davol |
| 50669 | /mypss/item... | Cath Urethral Red Rubber 14 Fr 50/Cs | PRU114 | Allegiance |
| 9259 | /mypss/item... | Cath Urethral Red Rubber 14 Fr Coude Single Eye... | 010114 | Bard |
| 9578 | /mypss/item... | Cath Urethral Red Rubber 14 Fr Open Coude 2 Sta... | 120614 | Bard |
| 1917 | /mypss/item... | Cath Urethral Red Rubber 16 Fr 16" 5 Opposed Eye... | 351016 | Rusch |
| 1234 | /mypss/item... | Cath Urethral Red Rubber 16 Fr 16" Round Hollow... | 0094160 | Bard |
| 9236 | /mypss/item... | Cath Urethral Red Rubber 16 Fr 16" Round Hollow... | 177716 | Bard |
| 497 | /mypss/item... | Cath Urethral Red Rubber 16 Fr 50/Cs | PRU116 | Allegiance |
| 9260 | /mypss/item... | Cath Urethral Red Rubber 16 Fr Coude Single Eye... | 010116 | Bard |
| 8899 | /mypss/item... | Cath Urethral Red Rubber 16 Fr Open Coude 2 Sta... | 120616 | Bard |
| 3963 | /mypss/item... | Cath Urethral Red Rubber 18 Fr 16" 6 Opposed Eye... | 351018 | Rusch |
| 14847 | /mypss/item... | Cath Urethral Red Rubber 18 Fr 50/Cs | PRU118 | Allegiance |
| 8129 | /mypss/item... | Cath Urethral Red Rubber 18 Fr Coude Single Eye... | 010118 | Bard |
| 4565 | /mypss/item... | Cath Urethral Red Rubber 8 Fr 16" 2 Opposed Eyes... | 351008 | Rusch |

FIG. 4c

Security National Bank of South Dakota
FORM 13F INFORMATION TABLE ENTRY TOTAL: 18
Date: 12/29/00
FORM TABLE13F
VALUE

| NAME OF ISSUER | TITLE OF CLASS | CUSIP | (X$1000) | PRN | AMT |
|---|---|---|---|---|---|
| ABBOTT LABORATORIES | COMMON STOCK | 02824100 | 165 | 3400 | |
| AMERICAN EXPRESS CO COM | COMMON STOCK | 025816109 | 433 | 7890 | |
| AMERICAN HOME PRODS CORP COM | COMMON STOCK | 026609107 | 842 | | 13248 |
| AMERICAN HOME PRODS CORP COM | COMMON STOCK | 026609107 | 245 | 3850 | |
| AMERICAN INTL GROUP INC | COMMON STOCK | 026874107 | 548 | 5560 | |
| AMERICAN INTL GROUP INC | COMMON STOCK | 026874107 | 119 | 1203 | |
| BERKSHIRE HATHAWAY INC DEL CL | COMMON STOCK | 084670108 | 142 | | 2000 |
| BERKSHIRE HATHAWAY INC DEL CL | COMMON STOCK | 084670108 | 71 | | 1000 |
| BERKSHIRE HATHAWAY INC DEL CL | COMMON STOCK | 084670207 | 268 | 114 | |
| BP AMOCO PLC SPONSORED ADR | COMMON STOCK | 055622104 | 969 | | 20243 |
| BP AMOCO PLC SPONSORED ADR | COMMON STOCK | 055622104 | 297 | | 6196 |
| BRISTOL-MYERS SQUIBB CO | COMMON STOCK | 110122108 | 1793 | | 24249 |
| BRISTOL-MYERS SQUIBB CO | COMMON STOCK | 110122108 | 612 | | 8280 |
| CITIGROUP INC | COMMON STOCK | 172967101 | 404 | | 7903 |
| CITIGROUP INC | COMMON STOCK | 172967101 | 149 | 2915 | |
| COCA COLA CO COM | COMMON STOCK | 191216100 | 817 | | 13415 |
| COCA COLA CO COM | COMMON STOCK | 191216100 | 472 | | 7741 |
| DOW CHEM ENG CO COM | COMMON STOCK | 260543103 | 143 | 3900 | |

FIG. 5

| | NAME OF ISSUER | TITLE OF CLASS | CUSIP | VALUE (X$1000) | PRN AMT |
|---|---|---|---|---|---|
| 1 | NAME OF ISSUER | TITLE OF CLASS | CUSIP | VALUE (X$1000) | PRN AMT |
| 2 | | | | | |
| 3 | ABBOTT LABORATORIES | COMMON STOCK | 2824100 | 165 | 3400 |
| 4 | AMERICAN EXPRESS CO COM | COMMON STOCK | 25816109 | 433 | 7890 |
| 5 | AMERICAN HOME PRODS CORP COM | COMMON STOCK | 26603107 | 842 | 13248 |
| 6 | AMERICAN HOME PRODS CORP COM | COMMON STOCK | 26603107 | 245 | 3850 |
| 7 | AMERICAN INTL GROUP INC | COMMON STOCK | 26874107 | 548 | 5560 |
| 8 | AMERICAN INTL GROUP INC | COMMON STOCK | 26874101 | 113 | 1203 |
| 9 | BERKSHIRE HATHAWAY INC DEL CL | COMMON STOCK | 84670108 | 142 | 2000 |
| 10 | BERKSHIRE HATHAWAY INC DEL CL | COMMON STOCK | 84670108 | 71 | 1000 |
| 11 | BERKSHIRE HATHAWAY INC DEL CL | COMMON STOCK | 84670207 | 268 | 114 |
| 12 | BP AMOCO PLC SPONSORED ADR | COMMON STOCK | 55622104 | 969 | 20243 |
| 13 | BP AMOCO PLC SPONSORED ADR | COMMON STOCK | 55622104 | 291 | 6196 |
| 14 | BRISTOL-MYERS SQUIBB CO | COMMON STOCK | 110122108 | 1793 | 24249 |
| 15 | BRISTOL-MYERS SQUIBB CO | COMMON STOCK | 110122108 | 612 | 8280 |
| 16 | CITIGROUP INC | COMMON STOCK | 112957101 | 404 | 7303 |
| 17 | CITIGROUP INC | COMMON STOCK | 112957101 | 149 | 2915 |
| 18 | COCA COLA CO COM | COMMON STOCK | 191216100 | 817 | 13415 |
| 19 | COCA COLA CO COM | COMMON STOCK | 191216100 | 472 | 7741 |
| 20 | DOW CHEM ENG CO COM | COMMON STOCK | 260543103 | 143 | 3900 |

METHODS FOR DETERMINING THE SIMILARITY OF CONTENT AND STRUCTURING UNSTRUCTURED CONTENT FROM HETEROGENEOUS SOURCES

This application claims the benefit of provisional application Ser. No. 60/410,684, filed Sep. 13, 2002, the complete disclosure of which is hereby incorporated by reference.

The Federal Government shall have a non-exclusive, non-transferable, irrevocable, paid-up license to practice or have practiced for or on behalf of the United States the subject invention throughout the world as provided for by SBIR Grant No. 0128508 awarded by the National Science Foundation.

A portion of the disclosure of this patent document contains material which is subject to copyright protection. The copyright owner has no objection to the facsimile reproduction by one of the patent disclosure as it appears in the Patent and Trademark Office patent files or records but otherwise reserves all copyright rights whatsoever.

BACKGROUND OF THE INVENTION

1. Field of the Invention

The invention relates to researching and organizing information from a plurality of sources. More particularly, the invention relates to computer assisted mining and organization of information from electronic sources.

2. Brief Description of the Prior Art

Never in the history of humanity has there been so much information available to so many people. The advent of the World Wide Web in the early 1990s created the ability to access information stored in computer databases all over the world from any computer connected to the PSTN (public switched telephone network). According to the Online Computer Library Center, Inc. (http://wcp.oclc.org/), there were approximately 2,851,000 web sites in 1998 and approximately 8,712,000 in 2002. Although growth has slowed, the number of websites is still increasing every year.

Many websites contain little or no useful information. However, there are also many websites which contain a wealth of valuable information. The difficulty is in locating and organizing the available information. Many so-called search engines attempt to organize the content of the World Wide Web. The most well known are, perhaps, Yahoo and Google. While these search engines are helpful for the casual user, they are incomplete and often inaccurate. Moreover, information retrievable from the Internet is not formatted in a standard uniform structure. For example, data may be in HTML format, PDF format, Microsoft Word (.doc) format, tab-delimited format, XML format, etc. Even information found in the same document format are often presented in various sources. For example, data may be tabled in some sources, and described in free text in others. Additionally, different lexicons are often used to describe the same features. Thus, in order to mine information for use in a queriable database, the information must be restructured to a uniform view.

Businesses have always recognized that accurate, precise, coherent data is a powerful tool for making sound business decisions. Many businesses have realized that extremely valuable information can be mined from the World Wide Web as well as from other Internet resources such as "news groups" and "ftp sites" and from their own electronic data. However, successfully retrieving and organizing this information is costly and time consuming. The state of the art approach is to employ skilled data and domain experts to manually extract, classify, structure and categorize data. This process can take up to an hour for a single data entry. In addition to information mined from the Internet, it would be desirable to integrate that information with existing "legacy data" in a company's own electronic file system. Much of this data is only semi-structured, e.g. tabular data in a text document, or completely unstructured, e.g. free flowing text.

SUMMARY OF THE INVENTION

It is therefore an object of the invention to facilitate the retrieval and organization of information from multiple locations and types of data sources.

It is also an object of the invention to facilitate the retrieval and organization of information from multiple data sources connected to the Internet.

It is still another object of the invention to facilitate the retrieval and organization of information from multiple data sources connected to the World Wide Web.

It is yet another object of the invention to facilitate the restructuring of information to a uniform format for use in a queriable database.

It is also an object of the invention to facilitate the structuring of unstructured and semi-structured information to a uniform format for use in a queriable database.

It is still another object of the invention to provide methods of matching and determining the similarity of data.

Accordingly, the methods of the present invention include acquiring data of interest, creating a knowledge base which represents the semantics of the domain of interest, using the knowledge base to categorize the content of the acquired data and to infer values of its attributes, and comparing and quantifying the similarity of the data content.

The step of acquiring (the acquisition process) is example driven. That is, the user provides examples of the data to be extracted (mined), preferably via an easy to use graphical interface. An algorithm is provided which uses the examples to access and extract data from specified sources, to infer meaning from the extracted data, and to rapidly structure the data into a useful format.

The invention provides several software tools for acquiring and organizing information. The tools include a web agent creator for creating web agents or "bots" which penetrate websites and harvest desired information. These bots are capable of following links and filling in forms to reach desired information buried deep in a website. A text extractor tool is also provided to extract tabular data from text documents. The text extractor uses a clustering algorithm to determine column and row delimiters of tables embedded in text documents. In order to classify information, the invention provides an ontology management system and an ontology directed classifier. The ontology management system stores and manages classes and their relationships as well as objects and their attributes. The ontology directed classifier has four stages: taxonomy token weighting, node weighting for descriptors, weight propagation and normalization, and determining the best class and cone, a sub-tree of the taxonomy. An ontology directed extractor enables automated extraction of attribute-value pairs from a textual description of an object based on ontology knowledge of a class to which the object was classified. Lastly, the invention provides a validation component. The validation component utilizes ANSI/ASQC Z1.4-1993 "Sampling Procedures and Tables for Inspection by Attributes", which is applied iteratively on random samples. An acceptable quality level (AQL) is selected and compared to a random sample. If the sample has fewer defects than the AQL, a lower AQL is selected and applied to another random sample. The process is repeated until a sample with more defects than the selected AQL is found. The last successful AQL is taken to be accurate. If the first random sample has more defects than the selected AQL, the AQL is raised and applied to another random sample. This is repeated until a sample is found to pass the AQL and that AQL is taken to be accurate.

The tools of the invention operate independently and together, e.g. the output of one tool providing input for another tool.

BRIEF DESCRIPTION OF THE DRAWINGS

FIG. 3 is a screen shot of the main user interface of the web agent creator;

FIG. 5 is an illustration of semi-structured tabular data having no column delimiters;

FIG. 7 is a screen shot illustrating the data of FIG. 5 after structuring by the text extractor tool;

FIG. 9 is a screen shot illustrating the operation of the ontology directed classifier;

FIG. 12 is a screen shot illustrating data acquired by the ontology data extractor.

BRIEF DESCRIPTION OF THE APPENDICES

Figure 1:
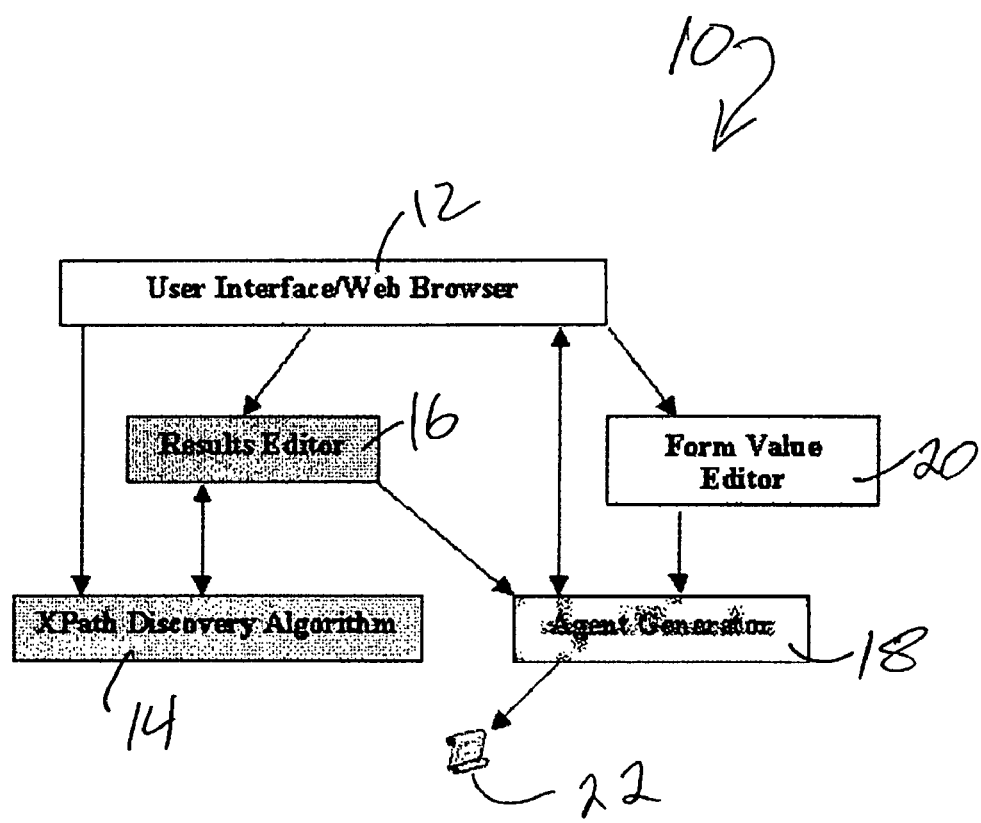
FIG. 1 is a schematic diagram of a web agent creator according to the invention.

Appendix A is a document (21 pages including Table of Contents) describing an ontology-directed matcher according to the invention.

Appendix B is a document (23 pages including Table of Contents) comprising a user guide to ontology-directed matcher software according to the invention.

The attached CDROM appendix includes source code for the tools of the invention. The CDROM is in ISO 9660 format and contains the following files:

| Name | Size | Last Modified |
|---|---|---|
| XSB_SOURCE090903 | 36,803,028 | |
| :AgentManager | 2,965,893 | |
| ::com | 2,965,893 | |
| :::xsb | 2,965,893 | |
| ::::LibConstants.java | 332 | 5/15/02 11:21 AM |
| ::::extraction | 55,909 | |
| :::::tableextractor | 55,909 | |
| ::::::AncestorList.java | 1,150 | 11/26/01 7:50 AM |
| ::::::CheckValidTable.java | 2,053 | 11/26/01 7:49 AM |
| ::::::ConvertTablesToList.java | 3,276 | 11/26/01 7:48 AM |

-continued

| Name | Size | Last Modified |
|---|---|---|
| ::::::CreateTables.java | 19,217 | 11/26/01 2:53 PM |
| ::::::DOMTableExtractor.java | 10,639 | 11/28/01 12:26 PM |
| ::::::DataActionObject.java | 879 | 11/26/01 7:40 AM |
| ::::::DataObject.java | 1,021 | 11/26/01 11:04 AM |
| ::::::ExtractTableFromDomTree.java | 3,550 | 11/26/01 7:49 AM |
| ::::::GenerateKeywordList.java | 1,150 | 11/27/01 5:37 PM |
| ::::::TableExtractor.java | 1,476 | 11/28/01 12:27 PM |
| ::::::TableExtractorException.java | 617 | 11/29/01 9:07 AM |
| ::::::TagNames.java | 481 | 11/26/01 7:48 AM |
| ::::::TraverseDOMTree.java | 10,400 | 11/28/01 12:26 PM |
| :::::images | 14,019 | |
| ::::::ani_robot.gif | 974 | 1/21/02 9:10 PM |
| ::::::bandage16x16.gif | 860 | 5/1/02 12:11 PM |
| ::::::help.gif | 161 | 6/25/03 12:11 PM |
| ::::::map16x16.gif | 935 | 9/28/01 4:03 PM |
| ::::::mbclosed.gif | 1,308 | 5/1/02 12:11 PM |
| ::::::mbopen.gif | 1,299 | 5/1/02 12:11 PM |
| ::::::microscope16x16.gif | 877 | 5/1/02 12:11 PM |
| ::::::right_arrow.gif | 822 | 7/30/02 9:46 AM |
| ::::::xrover_ode.jpg | 5,892 | 5/1/02 12:11 PM |
| ::::::xsb_icon_16_16_trans.gif | 891 | 5/1/02 12:11 PM |
| :::::launcher | 623,039 | |
| ::::::AddDialog.form | 7,778 | 1/4/01 6:07 PM |
| ::::::AddDialog.java | 12,216 | 7/24/03 10:08 AM |
| ::::::AddFileDialog.form | 9,652 | 1/4/01 6:07 PM |
| ::::::AddFileDialog.java | 8,884 | 1/24/01 7:21 AM |
| ::::::AdvancedPrefPanel.form | 14,117 | 6/30/03 1:41 PM |
| ::::::AdvancedPrefPanel.java | 17,674 | 7/1/03 10:17 AM |
| ::::::ArtificialGlobalsInputSourceList.java | 854 | 7/24/03 10:08 AM |
| ::::::Constants.java | 12,045 | 7/24/03 10:08 AM |
| ::::::Constants_prob.java | 11,699 | 7/24/03 10:07 AM |
| ::::::EmailConfigPanel.form | 5,759 | 10/9/01 8:03 AM |
| ::::::EmailConfigPanel.java | 9,122 | 7/24/03 10:08 AM |
| ::::::Launcher.form | 11,303 | 9/12/02 4:25 PM |
| ::::::Launcher.java | 53,298 | 7/24/03 10:08 AM |
| ::::::LogWPanel.java | 18,650 | 7/24/03 10:08 AM |
| ::::::NewLauncher.form | 7,741 | 8/20/03 1:48 PM |
| ::::::NewLauncher.java | 55,579 | 8/20/03 1:48 PM |
| ::::::OutputWPanel.form | 346 | 1/4/01 6:07 PM |

-continued

| Name | Size | Last Modified |
|---|---|---|
| :::::OutputWPanel.java | 46,264 | 7/24/03 10:08 AM |
| :::::PDFFileWPanel.java | 31,590 | 7/24/03 10:08 AM |
| :::::PongPanel.form | 266 | 10/30/01 6:40 AM |
| :::::PongPanel.java | 7,121 | 10/30/01 6:40 AM |
| :::::QueryWPanel.java | 16,760 | 7/24/03 10:08 AM |
| :::::ScheduleEditorPanel.form | 5,807 | 7/18/03 11:29 AM |
| :::::ScheduleEditorPanel.java | 17,238 | 7/24/03 10:08 AM |
| :::::SitePlanWPanel.java | 7,838 | 7/24/03 10:08 AM |
| :::::SitemapCatalogPrefPanel.form | 4,600 | 6/30/03 1:33 PM |
| :::::SitemapCatalogPrefPanel.java | 8,127 | 7/1/03 10:37 AM |
| :::::TaskCatalogPanel.form | 2,047 | 1/29/03 2:13 PM |
| :::::TaskCatalogPanel.java | 6,747 | 10/14/02 12:53 PM |
| :::::TaskDirectoryPrefPanel.form | 4,949 | 6/26/03 10:49 AM |
| :::::TaskDirectoryPrefPanel.java | 10,023 | 7/1/03 10:23 AM |
| :::::TaskInputPanel.form | 12,440 | 7/18/03 1:32 PM |
| :::::TaskInputPanel.java | 45,647 | 7/24/03 10:08 AM |
| :::::TaskLogPanel.form | 1,132 | 10/9/01 7:50 AM |
| :::::TaskLogPanel.java | 1,566 | 10/9/01 7:50 AM |
| :::::TaskOutputPanel.form | 29,397 | 6/20/03 1:07 PM |
| :::::TaskOutputPanel.java | 39,938 | 6/20/03 1:07 PM |
| :::::TaskSchedulerPanel.form | 1,126 | 10/30/01 6:40 AM |
| :::::TaskSchedulerPanel.java | 3,225 | 10/30/01 6:40 AM |
| :::::TaskTreeTableModel.java | 8,002 | 11/15/01 4:07 PM |
| :::::TaskTreeTableNode.java | 5,860 | 7/17/03 6:03 AM |
| :::::TaskWizard.form | 6,161 | 4/26/02 2:17 PM |
| :::::TaskWizard.java | 13,667 | 7/11/02 10:24 AM |
| :::::TaskWizardDialog.form | 1,897 | 10/30/01 6:39 AM |
| :::::TaskWizardDialog.java | 5,089 | 7/24/03 10:08 AM |
| :::::TaskWizardPanel.form | 520 | 9/12/02 1:26 PM |
| :::::TaskWizardPanel.java | 6,050 | 1/30/03 8:34 AM |
| :::::XRoverTaskJTreeTable.java | 5,089 | 7/24/03 10:08 AM |
| :::::images | 10,139 | |
| ::::::icon.gif | 1,375 | 12/10/02 5:41 AM |
| ::::::splash.jpg | 7,873 | 6/3/03 9:35 AM |
| ::::::xsb__icon.gif | 891 | 1/10/01 8:52 AM |
| ::::ui | 376,528 | |
| :::::AboutDialog.form | 2,176 | 7/10/03 11:37 AM |
| :::::AboutDialog.java | 4,165 | 7/10/03 11:37 AM |
| :::::AboutPanel.form | 2,673 | 7/10/03 11:34 AM |
| :::::AboutPanel.java | 2,892 | 7/10/03 11:34 AM |
| :::::AlternateColorJTable.java | 1,806 | 7/24/03 9:58 AM |
| :::::ApplicationInformation.java | 17,914 | 7/10/03 6:43 AM |
| :::::AttributableTableModel.java | 9,505 | 5/27/03 12:04 PM |
| :::::AuthProxyPreferencesPanel.form | 12,175 | 6/30/03 1:46 PM |
| :::::AuthProxyPreferencesPanel.java | 30,639 | 7/24/03 9:58 AM |
| :::::CachingJComboBox.java | 3,823 | 7/24/03 9:58 AM |
| :::::CertificatePolicyPanel.form | 2,011 | 9/13/01 11:44 AM |
| :::::CertificatePolicyPanel.java | 2,064 | 7/10/03 6:45 AM |
| :::::DirectorySelectorPanel.form | 2,258 | 6/20/03 11:36 AM |
| :::::DirectorySelectorPanel.java | 5,926 | 6/20/03 11:36 AM |
| :::::FileViewTree.java | 6,768 | 7/24/03 9:58 AM |
| :::::FileViewTreeField.java | 8,798 | 7/24/03 12:31 PM |
| :::::FileViewTreeModel.java | 6,597 | 7/24/03 9:58 AM |
| :::::HostnameField.java | 1,201 | 7/24/03 9:58 AM |
| :::::ImagePanel.form | 529 | 6/2/03 9:30 AM |
| :::::ImagePanel.java | 3,091 | 6/3/03 9:45 AM |
| :::::LookAndFeelJMenu.java | 4,574 | 7/24/03 9:58 AM |
| :::::NonEditableTableModel.java | 936 | 7/24/03 9:58 AM |
| :::::PasswordComboBoxEditor.java | 3,166 | 6/23/03 5:59 AM |
| :::::PreferencesEditor.java | 17,876 | 7/24/03 9:58 AM |
| :::::PreferencesPanel.java | 2,484 | 7/24/03 9:58 AM |
| :::::SchedulerPanel.form | 8,102 | 2/15/02 7:14 AM |
| :::::SchedulerPanel.java | 17,844 | 7/24/03 9:58 AM |
| :::::SizzleButton.java | 2,730 | 11/6/01 10:34 AM |
| :::::SplashPanel.form | 6,761 | 6/3/03 9:45 AM |
| :::::SplashPanel.java | 8,313 | 6/9/03 1:36 PM |
| :::::SplashScreen.java | 5,402 | 6/9/03 1:36 PM |
| :::::TimeChooserDialog.form | 2,885 | 6/23/03 6:48 AM |
| :::::TimeChooserDialog.java | 5,264 | 7/24/03 9:58 AM |
| :::::TimeChooserPanel.form | 9,654 | 7/8/01 5:15 PM |
| :::::TimeChooserPanel.java | 16,768 | 7/24/03 9:58 AM |
| :::::UIUtils.java | 21,907 | 7/24/03 9:58 AM |
| :::::WizardTabView.form | 974 | 4/19/01 9:30 AM |
| :::::WizardTabView.java | 3,528 | 7/24/03 12:31 PM |
| :::::XSBDirectorySelectorDialog.form | 4,215 | 11/9/01 2:19 PM |
| :::::XSBDirectorySelectorDialog.java | 5,889 | 11/9/01 2:19 PM |

-continued

| Name | Size | Last Modified |
|---|---|---|
| :::::XSBWizardPanel.java | 2,727 | 7/24/03 9:58 AM |
| :::::webbrowser | 97,518 | |
| :::::MozillaParserPromptSupport.java | 2,345 | 5/14/02 8:04 AM |
| :::::MozillaUtils.java | 19,636 | 6/5/03 8:17 AM |
| ::::::dom | 75,537 | |
| ::::::::AbstractMagnet.java | 10,470 | 7/24/03 9:58 AM |
| ::::::::AnchorMagnet.java | 3,593 | 7/24/03 9:58 AM |
| ::::::::DefaultAnchorMagnet.java | 7,099 | 7/24/03 9:58 AM |
| ::::::::DefaultTextMagnet.java | 1,838 | 7/24/03 9:58 AM |
| ::::::::ERExpression.java | 9,606 | 7/24/03 9:58 AM |
| ::::::::Isolator.java | 3,976 | 7/24/03 9:58 AM |
| ::::::::Magnet.java | 4,793 | 7/24/03 9:58 AM |
| ::::::::MagnetFactory.java | 1,963 | 7/24/03 9:58 AM |
| ::::::::MozillaParserImpl.java | 19,508 | 7/31/03 1:04 PM |
| ::::::::NodeListImpl.java | 3,116 | 7/24/03 9:58 AM |
| ::::::::Parser.java | 734 | 7/24/03 9:58 AM |
| ::::::::TextMagnet.java | 801 | 7/24/03 9:58 AM |
| ::::::xpath | 8,040 | |
| ::::::::XPathException.java | 1,135 | 7/24/03 9:58 AM |
| ::::::::XPathProcessor.java | 3,575 | 7/24/03 9:58 AM |
| ::::::::XPathProcessorImplOmQuery.java | 3,330 | 7/24/03 9:58 AM |
| :::::util | 361,323 | |
| :::::AbstractConsumerProcessor.java | 1,117 | 7/24/03 12:31 PM |
| :::::AbstractMessenger.java | 2,774 | 7/24/03 9:58 AM |
| :::::ClassInfo.java | 937 | 7/24/03 9:58 AM |
| :::::CommandLineParser.java | 3,533 | 7/24/03 9:58 AM |
| :::::Constant.java | 2,299 | 7/24/03 9:58 AM |
| :::::ConsumerPool.java | 22,286 | 7/24/03 9:58 AM |
| :::::ConsumerProcessor.java | 2,180 | 7/24/03 9:58 AM |
| :::::DBUtils.java | 36,537 | 7/24/03 9:58 AM |
| :::::DataStructureUtils.java | 9,500 | 7/24/03 9:58 AM |
| :::::DefaultFileFilter.java | 4,752 | 7/24/03 9:58 AM |
| :::::DefaultMessenger.java | 3,513 | 7/24/03 9:58 AM |
| :::::DevUtils.java | 4,222 | 7/24/03 9:58 AM |
| :::::HTTPContext.java | 1,023 | 10/2/02 7:20 AM |
| :::::IOUtils.java | 32,332 | 9/3/03 10:25 AM |
| :::::JSUtils.java | 1,698 | 3/5/03 11:38 AM |
| :::::License.java | 1,224 | 7/24/03 9:58 AM |
| :::::LogEntry.java | 2,092 | 7/24/03 9:58 AM |
| :::::MapEntryImpl.java | 1,232 | 7/17/03 6:08 AM |

-continued

| Name | Size | Last Modified |
|---|---|---|
| :::::MemoryQueue.java | 2,829 | 7/24/03 9:58 AM |
| :::::MessageConstant.java | 1,182 | 7/24/03 9:58 AM |
| :::::Messenger.java | 5,836 | 7/24/03 9:58 AM |
| :::::ObservableImpl.java | 443 | 7/16/03 10:42 AM |
| :::::Queue.java | 3,495 | 7/24/03 9:58 AM |
| :::::RegularExpression.java | 3,791 | 7/24/03 9:58 AM |
| :::::SharedLock.java | 12,196 | 1/8/02 8:22 AM |
| :::::SoftHashMap.java | 20,896 | 7/24/03 9:58 AM |
| :::::StringUtils.java | 32,122 | 8/20/03 1:59 PM |
| :::::TemporalLicense.java | 3,364 | 7/24/03 9:58 AM |
| :::::TrimConstant.java | 1,731 | 7/24/03 9:58 AM |
| :::::Utils.java | 44,739 | 7/24/03 9:58 AM |
| :::::WebUtils.java | 15,310 | 6/26/03 1:17 PM |
| :::::html | 5,960 | |
| ::::::AuthenticatingProxyConfig.java | 3,856 | 5/14/02 8:01 AM |
| ::::::ProxyConfig.java | 2,104 | 7/24/03 9:58 AM |
| :::::regexp | 27,456 | |
| ::::::Expression.java | 4,707 | 7/24/03 9:58 AM |
| ::::::Match.java | 2,809 | 7/24/03 9:58 AM |
| ::::::RegExprException.java | 1,877 | 7/24/03 9:58 AM |
| ::::::RegularExpression.java | 16,841 | 7/24/03 9:58 AM |
| ::::::SubExpressionMatch.java | 1,222 | 7/24/03 9:58 AM |
| :::::xmlserialization | 46,722 | |
| ::::::XMLDeserializationException.java | 1,296 | 7/24/03 9:58 AM |
| ::::::XMLSerializable.java | 2,836 | 7/24/03 9:58 AM |
| ::::::XMLSerializationException.java | 1,253 | 7/24/03 9:58 AM |
| ::::::XMLSerializer.java | 38,089 | 7/24/03 9:58 AM |
| ::::::XMLSerializerException.java | 1,266 | 7/24/03 9:58 AM |
| ::::::XMLSerializerObjectCache.java | 1,982 | 7/24/03 9:58 AM |
| ::::xml | 57,493 | |
| :::::dom | 57,493 | |
| ::::::DOMUtils.java | 50,191 | 9/5/03 7:50 AM |
| ::::::adapters | 7,302 | |
| ::::::KeyValuePairToAttrNodeAdapter.java | 4,152 | 6/9/03 1:55 PM |
| ::::::MapToNamedNodeMapAdapter.java | 3,150 | 6/9/03 1:51 PM |
| :::::xml2dbms | 136,181 | |
| :::::MapConstants.java | 933 | 8/22/01 11:31 AM |
| :::::Xml2Dbms.java | 40,328 | 7/24/03 9:58 AM |
| :::::Xml2DbmsException.java | 554 | 1/14/02 9:49 AM |
| :::::imagefiles | 158 | |
| ::::::srcfile.gif | 79 | 11/30/98 7:55 PM |
| ::::::textfile.gif | 79 | 11/30/98 7:56 PM |

-continued

| Name | Size | Last Modified |
|---|---|---|
| :::::initializationfiles | 94,208 | |
| ::::::blankdb.mdb | 94,208 | 8/9/01 7:24 AM |
| :::::xrover | 1,341,069 | |
| ::::::AbstractAction.java | 17,686 | 7/31/03 1:42 PM |
| ::::::AbstractDataContainer.java | 58,793 | 7/24/03 9:58 AM |
| ::::::AbstractFilter.java | 3,733 | 7/24/03 9:58 AM |
| ::::::AbstractFilterGroup.java | 2,855 | 7/24/03 9:58 AM |
| ::::::Action.java | 6,310 | 6/19/03 7:21 AM |
| ::::::ActionConstants.java | 740 | 7/24/03 9:57 AM |
| ::::::ActionFactory.java | 1,683 | 10/4/02 6:32 AM |
| ::::::Argument.java | 2,195 | 7/24/03 9:58 AM |
| ::::::DataContainer.java | 3,666 | 6/19/03 7:55 AM |
| ::::::DataContainerFactory.java | 8,198 | 7/14/03 7:42 AM |
| ::::::DataDefinitionCollection.java | 2,324 | 7/24/03 9:57 AM |
| ::::::DataDefinitionCollectionFactory.java | 3,463 | 12/19/02 2:06 PM |
| ::::::DataDefinitionConstants.java | 2,027 | 7/24/03 9:56 AM |
| ::::::DataObjectFileNotFoundException.java | 1,137 | 7/24/03 9:58 AM |
| ::::::DataTypes.java | 4,195 | 7/24/03 12:31 PM |
| ::::::DatabaseDataContainerImpl.java | 75,513 | 11/4/02 12:17 PM |
| ::::::DatabaseDataDefinitionCollection.java | 6,464 | 11/11/02 5:56 AM |
| ::::::DatabaseRootDataContainerImpl.java | 9,741 | 10/10/02 10:19 AM |
| ::::::DefaultActionImpl.java | 6,836 | 7/24/03 9:58 AM |
| ::::::DefaultDataContainerImpl.java | 9,293 | 7/8/03 9:57 AM |
| ::::::DefaultFilterGroup.java | 2,919 | 7/24/03 9:57 AM |
| ::::::DefaultGlobal.java | 2,450 | 1/30/03 2:52 PM |
| ::::::DefaultNumberFilter.java | 6,825 | 7/24/03 9:58 AM |
| ::::::DefaultRetriever.java | 18,607 | 9/9/03 1:07 PM |
| ::::::DefaultRootDataContainerImpl.java | 8,832 | 7/24/03 9:58 AM |
| ::::::DefaultStringFilter.java | 8,738 | 7/24/03 9:58 AM |
| ::::::DtdFileNotFoundException.java | 1,109 | 7/24/03 9:58 AM |
| ::::::EvaluationException.java | 649 | 2/24/03 12:39 PM |
| ::::::ExtractionErrorException.java | 1,056 | 7/24/03 9:58 AM |
| ::::::Filter.java | 1,111 | 7/24/03 9:58 AM |
| ::::::FilterGroup.java | 1,577 | 7/24/03 9:58 AM |
| ::::::Global.java | 1,089 | 1/30/03 8:06 AM |
| ::::::GlobalConstants.java | 3,482 | 8/12/03 7:11 AM |
| ::::::InvalidMapException.java | 753 | 11/29/01 9:02 AM |
| ::::::MalformedPlanException.java | 1,828 | 7/24/03 9:58 AM |
| ::::::NoSignatureMatchException.java | 1,060 | 7/24/03 9:58 AM |

-continued

| Name | Size | Last Modified |
|---|---|---|
| ::::::NumberFilterOperatorConstant.java | 1,407 | 7/24/03 9:57 AM |
| ::::::PageID.java | 3,455 | 7/24/03 9:58 AM |
| ::::::PageMapInterpreter.java | 147,594 | 8/18/03 10:27 AM |
| ::::::ProcessingException.java | 1,022 | 7/24/03 9:58 AM |
| ::::::Retriever.java | 5,605 | 9/9/03 1:07 PM |
| ::::::RootDataContainer.java | 694 | 9/4/02 3:38 PM |
| ::::::SiteMapInterpreter.java | 84,477 | 8/5/03 7:45 AM |
| ::::::SiteMapInterpreterException.java | 1,804 | 7/24/03 9:58 AM |
| ::::::SitePathTagConstants.java | 6,654 | 7/24/03 9:58 AM |
| ::::::StringFilterOperatorConstant.java | 2,296 | 7/24/03 9:58 AM |
| ::::::UndefinedDataTypeException.java | 1,064 | 7/24/03 9:58 AM |
| ::::::cluster | 119,468 | |
| ::::::scheduler | 119,468 | |
| :::::::DatabaseGlobalsInputSource.java | 13,349 | 7/24/03 9:58 AM |
| :::::::DefaultSingleGlobalsInputSource.java | 2,417 | 7/11/03 5:56 AM |
| :::::::GlobalsInputSource.java | 812 | 7/24/03 12:31 PM |
| :::::::GlobalsInputSourceException.java | 1,137 | 7/24/03 9:58 AM |
| :::::::GlobalsInputSourceList.java | 3,434 | 11/2/01 2:48 PM |
| :::::::ManagerImpl.java | 40,836 | 7/17/03 7:17 AM |
| :::::::MapGlobalsInputSource.java | 3,477 | 7/24/03 9:58 AM |
| :::::::MultipleGlobalsInputSource.java | 794 | 7/24/03 9:58 AM |
| :::::::Scheduler.java | 13,374 | 7/24/03 9:58 AM |
| :::::::SchedulingQueue.java | 6,408 | 7/24/03 9:58 AM |
| :::::::SingleGlobalsInputSource.java | 1,195 | 7/24/03 9:58 AM |
| :::::::WaitingQueue.java | 6,032 | 7/24/03 9:58 AM |
| :::::::XRoverTask.java | 15,197 | 7/24/03 9:58 AM |
| :::::::XRoverTaskConsumer.java | 2,077 | 7/24/03 9:58 AM |
| :::::::XRoverTaskConsumerException.java | 709 | 7/24/03 9:58 AM |
| :::::::XRoverTaskManager.java | 4,050 | 6/5/03 12:01 PM |
| :::::::XRoverTaskManagerEvent.java | 552 | 1/14/02 8:09 AM |
| :::::::XRoverTaskManagerListener.java | 1,247 | 1/14/02 8:09 AM |
| :::::::XRoverTaskObserver.java | 258 | 10/19/01 6:43 AM |
| :::::::XRoverTaskProducer.java | 1,404 | 7/24/03 9:58 AM |
| :::::::XRoverTaskProducerException.java | 709 | 7/24/03 9:58 AM |
| ::::::plugins | 40,989 | |
| :::::::ERExpressionPlugin.java | 27,220 | 7/24/03 9:58 AM |
| :::::::HTMLTableExtractorPlugin.java | 12,834 | 6/19/03 12:43 PM |
| :::::::Plugin.java | 935 | 7/24/03 9:58 AM |
| ::::::util | 635,603 | |
| :::::::AbstractDataContainerExporter.java | 9,629 | 7/24/03 9:58 AM |

-continued

| Name | Size | Last Modified |
|---|---|---|
| ::::::DOMParser.java | 40,324 | 7/24/03 9:58 AM |
| ::::::DataContainer.mdb | 331,776 | 2/3/03 10:49 AM |
| ::::::DataContainer2BarSeparated.java | 5,549 | 7/24/03 9:58 AM |
| ::::::DataContainer2CSV.java | 3,849 | 7/24/03 9:58 AM |
| ::::::DataContainer2HTML.java | 6,013 | 7/24/03 9:58 AM |
| ::::::DataContainer2TableModel.java | 19,279 | 7/24/03 9:58 AM |
| ::::::DataContainer2XML.java | 2,624 | 7/24/03 9:58 AM |
| ::::::DataContainerCompletedObserver.java | 1,740 | 7/24/03 9:58 AM |
| ::::::DataContainerDocumentAdapter.java | 19,195 | 10/4/02 7:46 AM |
| ::::::DataContainerExport.java | 1,728 | 7/24/03 9:58 AM |
| ::::::DataContainerExporter.java | 3,079 | 7/24/03 9:58 AM |
| ::::::DataContainerLeafNodeAdapter.java | 4,216 | 6/9/03 1:36 PM |
| ::::::DataContainerList.java | 2,216 | 6/9/03 2:04 PM |
| ::::::DataContainerNodeAdapter.java | 42,940 | 6/2/03 11:11 AM |
| ::::::DataContainerTextAdapter.java | 10,240 | 5/7/03 6:30 AM |
| ::::::DataContainerUtils.java | 10,983 | 6/9/03 2:08 PM |
| ::::::DataDefinitionCollectionCache.java | 3,846 | 7/24/03 9:58 AM |
| ::::::DatabaseDataContainerExporter.java | 6,504 | 7/24/03 9:58 AM |
| ::::::DefaultDataContainerExport.java | 3,326 | 7/24/03 9:58 AM |
| ::::::ExportException.java | 876 | 7/24/03 9:58 AM |
| ::::::FilterTreeModel.java | 4,686 | 7/24/03 9:58 AM |
| ::::::InputReader.java | 17,405 | 7/24/03 9:58 AM |
| ::::::Notifier.java | 602 | 8/22/02 7:29 AM |
| ::::::RootDataContainerObserver.java | 3,127 | 7/24/03 9:58 AM |
| ::::::SessionInfoBuilder.java | 3,739 | 5/13/03 9:37 AM |
| ::::::SessionInfoBuilderZipImpl.java | 7,542 | 6/2/03 12:03 PM |
| ::::::SessionInfoBuilderZipMergedImpl.java | 3,364 | 6/2/03 11:50 AM |
| ::::::SessionInfoConstants.java | 682 | 5/5/03 10:01 AM |
| ::::::SessionInfoZipImplConstants.java | 2,210 | 5/5/03 8:07 AM |
| ::::::TableModel2CSV.java | 7,042 | 7/24/03 9:58 AM |
| ::::::TableModel2CharSeparated.java | 10,855 | 7/24/03 9:58 AM |
| ::::::XML2DataDefinitionCollection.java | 13,018 | 7/24/03 9:58 AM |
| ::::::XMLDataContainerExporter.java | 7,979 | 7/24/03 9:58 AM |
| ::::::XMLException.java | 1,077 | 7/24/03 9:58 AM |
| ::::::XRoverDatabaseFactory.java | 5,697 | 1/16/03 7:58 AM |
| ::::::XRoverUtilities.java | 15,558 | 7/24/03 9:58 AM |
| ::::::XSLException.java | 1,088 | 7/24/03 9:58 AM |
| :EasyRover | 1,707,442 | |
| ::com | 1,707,442 | |
| :::xsb | 1,707,442 | |
| :::::LibConstants.java | 332 | 5/15/02 11:21 AM |
| ::::easyrover | 165,063 | |
| :::::AttributeEditor.form | 6,641 | 1/18/02 1:50 AM |
| :::::AttributeEditor.java | 15,854 | 2/20/02 6:43 AM |
| :::::Constants.java | 8,964 | 6/6/03 1:22 PM |
| :::::ERProxyPreferencesPanel.java | 2,131 | 6/7/02 1:10 PM |
| :::::EasyRover.java | 73,987 | 6/23/03 10:14 AM |
| :::::FormEditorFrame.java | 1,799 | 2/27/02 6:55 AM |
| :::::LimitedMozillaPromptSupport.java | 3,456 | 6/10/02 7:23 AM |
| :::::PathExtractionEditorDialog.java | 16,156 | 6/23/03 10:12 AM |
| :::::PathNameDocument.java | 1,316 | 10/24/02 12:58 PM |
| :::::RobotsDialog.form | 5,810 | 2/20/02 7:57 AM |
| :::::RobotsDialog.java | 6,409 | 2/20/02 7:57 AM |
| :::::images | 22,540 | |
| ::::::anim_tree.gif | 3,134 | 1/17/02 9:44 PM |
| ::::::flashingRedLED.gif | 181 | 8/19/02 6:21 AM |
| ::::::flashing_caution.gif | 144 | 1/17/02 9:44 PM |
| ::::::icon.gif | 1,395 | 12/10/02 5:41 AM |
| ::::::kiwi | 747 | |
| :::::::blank.gif | 100 | 1/17/02 9:44 PM |
| :::::::caution.gif | 138 | 1/17/02 9:44 PM |
| :::::::led-green-on.gif | 142 | 1/17/02 9:44 PM |
| :::::::led-off.gif | 140 | 1/17/02 9:44 PM |
| :::::::led-red-on.gif | 142 | 1/17/02 9:44 PM |
| :::::::no.small.gif | 85 | 1/17/02 9:44 PM |
| :::::::led-yellow-on.gif | 890 | 1/17/02 9:44 PM |
| :::::::red_caution.gif | 885 | 1/18/02 3:05 AM |
| :::::::robots_warning.gif | 399 | 1/17/02 9:44 PM |
| :::::::splash.jpg | 14,631 | 6/6/03 1:22 PM |
| :::::::tree.gif | 134 | 1/17/02 9:44 PM |
| ::::extraction | 55,909 | |
| ::::tableextractor | 55,909 | |
| :::::AncestorList.java | 1,150 | 11/26/01 7:50 AM |
| :::::CheckValidTable.java | 2,053 | 11/26/01 7:49 AM |
| :::::ConvertTablesToList.java | 3,276 | 11/26/01 7:48 AM |
| :::::CreateTables.java | 19,217 | 11/26/01 2:53 PM |
| :::::DOMTableExtractor.java | 10,639 | 11/28/01 12:26 PM |
| :::::DataActionObject.java | 879 | 11/26/01 7:40 AM |
| :::::DataObject.java | 1,021 | 11/26/01 11:04 AM |
| :::::ExtractTableFromDomTree.java | 3,550 | 11/26/01 7:49 AM |

-continued

| Name | Size | Last Modified |
|---|---|---|
| ::::::GenerateKeywordList.java | 1,150 | 11/27/01 5:37 PM |
| ::::::TableExtractor.java | 1,476 | 11/28/01 12:27 PM |
| ::::::TableExtractorException.java | 617 | 11/29/01 9:07 AM |
| ::::::TagNames.java | 481 | 11/26/01 7:48 AM |
| ::::::TraverseDOMTree.java | 10,400 | 11/28/01 12:26 PM |
| :::::images | 14,019 | |
| ::::::ani_robot.gif | 974 | 1/21/02 9:10 PM |
| ::::::bandage16x16.gif | 860 | 5/1/02 12:11 PM |
| ::::::help.gif | 161 | 6/25/03 12:11 PM |
| ::::::map16x16.gif | 935 | 9/28/01 4:03 PM |
| ::::::mbclosed.gif | 1,308 | 5/1/02 12:11 PM |
| ::::::mbopen.gif | 1,299 | 5/1/02 12:11 PM |
| ::::::microscope16x16.gif | 877 | 5/1/02 12:11 PM |
| ::::::right_arrow.gif | 822 | 7/30/02 9:46 AM |
| ::::::xrover_ode.jpg | 5,892 | 5/1/02 12:11 PM |
| ::::::xsb_icon_16_16_trans.gif | 891 | 5/1/02 12:11 PM |
| :::::ui | 348,680 | |
| ::::::AttributableTableModel.java | 9,505 | 5/27/03 12:04 PM |
| ::::::DirectorySelectorPanel.form | 2,258 | 6/20/03 11:36 AM |
| ::::::DirectorySelectorPanel.java | 5,926 | 6/20/03 11:36 AM |
| ::::::FileViewTree.java | 6,768 | 7/24/03 9:58 AM |
| ::::::FileViewTreeModel.java | 6,597 | 7/24/03 9:58 AM |
| ::::::HostnameField.java | 1,201 | 7/24/03 9:58 AM |
| ::::::ImagePanel.form | 529 | 6/2/03 9:30 AM |
| ::::::ImagePanel.java | 3,091 | 6/3/03 9:45 AM |
| ::::::PreferencesEditor.java | 17,876 | 7/24/03 9:58 AM |
| ::::::PreferencesPanel.java | 2,484 | 7/24/03 9:58 AM |
| ::::::ProxyPreferencesPanel.form | 4,175 | 6/6/02 6:45 AM |
| ::::::ProxyPreferencesPanel.java | 10,064 | 7/24/03 9:58 AM |
| ::::::SplashPanel.form | 6,761 | 6/3/03 9:45 AM |
| ::::::SplashPanel.java | 8,313 | 6/9/03 1:36 PM |
| ::::::SplashScreen.java | 5,402 | 6/9/03 1:36 PM |
| ::::::UIUtils.java | 21,907 | 7/24/03 9:58 AM |
| ::::::WizardTabView.form | 974 | 4/19/01 9:30 PM |
| ::::::WizardTabView.java | 3,528 | 7/24/03 12:31 PM |
| ::::::XSBDirectorySelectorDialog.form | 4,215 | 11/9/01 2:19 PM |
| ::::::XSBDirectorySelectorDialog.java | 5,889 | 11/9/01 2:19 PM |
| ::::::XSBWizardPanel.java | 2,727 | 7/24/03 9:58 AM |
| :::::webbrowser | 218,490 | |
| ::::::MozillaBrowserFrame.java | 35,353 | 9/9/03 1:11 PM |
| ::::::MozillaParserPromptSupport.java | 2,345 | 5/14/02 8:04 AM |
| ::::::MozillaPromptSupport.java | 3,696 | 5/14/02 8:03 AM |
| ::::::MozillaUtils.java | 19,636 | 6/5/03 8:17 AM |
| ::::::RenderedView.java | 782 | 7/24/03 9:58 AM |
| :::::dom | 156,678 | |
| ::::::::AbstractMagnet.java | 10,470 | 7/24/03 9:58 AM |
| ::::::::AnchorMagnet.java | 3,593 | 7/24/03 9:58 AM |
| ::::::::DOMSelectionHandler.java | 15,288 | 8/28/03 2:34 PM |
| ::::::::DefaultAnchorMagnet.java | 7,099 | 7/24/03 9:58 AM |
| ::::::::DefaultTextMagnet..java | 1,838 | 7/24/03 9:58 AM |
| ::::::::ERConstants.java | 3,950 | 7/24/03 9:58 AM |
| ::::::::ERExpression.java | 9,606 | 7/24/03 9:58 AM |
| ::::::::EasyRover.java | 9,461 | 7/24/03 9:58 AM |
| ::::::::Isolator.java | 3,976 | 7/24/03 9:58 AM |
| ::::::::Magnet.java | 4,793 | 7/24/03 9:58 AM |
| ::::::::MagnetFactory.java | 1,963 | 7/24/03 9:58 AM |
| ::::::::MapSerializableArgument.java | 1,136 | 11/5/01 2:06 PM |
| ::::::::MozillaParserImpl.java | 19,508 | 7/31/03 1:04 PM |
| ::::::::NodeHighlightSupport.java | 8,355 | 9/9/03 1:07 PM |
| ::::::::NodeListImpl.java | 3,116 | 7/24/03 9:58 AM |
| ::::::::Parser.java | 734 | 7/24/03 9:58 AM |
| ::::::::TextMagnet.java | 801 | 7/24/03 9:58 AM |
| ::::::::XPathExpression.java | 42,951 | 7/24/03 9:58 AM |
| :::::xpath | 8,040 | |
| ::::::::XPathException.java | 1,135 | 7/24/03 9:58 AM |
| ::::::::XPathProcessor.java | 3,575 | 7/24/03 9:58 AM |
| ::::::::XPathProcessorImplOmQuery.java | 3,330 | 7/24/03 9:58 AM |
| :::::util | 259,514 | |
| :::::AbstractMessenger.java | 2,774 | 7/24/03 9:58 AM |
| :::::ClassInfo.java | 937 | 7/24/03 9:58 AM |
| :::::CommandLineParser.java | 3,533 | 7/24/03 9:58 AM |
| :::::Constant.java | 2,299 | 7/24/03 9:58 AM |
| :::::DBUtils.java | 36,537 | 7/24/03 9:58 AM |
| :::::DataStructureUtils.java | 9,500 | 7/24/03 9:58 AM |
| :::::DefaultMessenger.java | 3,513 | 7/24/03 9:58 AM |
| :::::DevUtils.java | 4,222 | 7/24/03 9:58 AM |
| :::::HTTPContext.java | 1,023 | 10/2/02 7:20 AM |
| :::::IOUtils.java | 32,332 | 9/3/03 10:25 AM |

-continued

| Name | Size | Last Modified |
|---|---|---|
| :::::JSUtils.java | 1,698 | 3/5/03 11:38 AM |
| :::::License.java | 1,224 | 7/24/03 9:58 AM |
| :::::MessageConstant.java | 1,182 | 7/24/03 9:58 AM |
| :::::Messenger.java | 5,836 | 7/24/03 9:58 AM |
| :::::Queue.java | 3,495 | 7/24/03 9:58 AM |
| :::::RegularExpression.java | 3,791 | 7/24/03 9:58 AM |
| :::::SoftHashMap.java | 20,896 | 7/24/03 9:58 AM |
| :::::StringUtils.java | 32,122 | 8/20/03 1:59 PM |
| :::::TemporalLicense.java | 3,364 | 7/24/03 9:58 AM |
| :::::TrimConstant.java | 1,731 | 7/24/03 9:58 AM |
| :::::Utils.java | 44,739 | 7/24/03 9:58 AM |
| :::::WebUtils.java | 15,310 | 6/26/03 1:17 PM |
| :::::regexp | 27,456 | |
| :::::::Expression.java | 4,707 | 7/24/03 9:58 AM |
| :::::::Match.java | 2,809 | 7/24/03 9:58 AM |
| :::::::RegExprException.java | 1,877 | 7/24/03 9:58 AM |
| :::::::RegularExpression.java | 16,841 | 7/24/03 9:58 AM |
| :::::::SubExpressionMatch.java | 1,222 | 7/24/03 9:58 AM |
| :::::xml | 125,853 | |
| :::::dom | 125,853 | |
| :::::::DOMUtils.java | 50,191 | 9/5/03 7:50 AM |
| :::::::FormDataPanel.form | 9,214 | 8/8/02 7:12 AM |
| :::::::FormDataPanel.java | 18,519 | 7/24/03 9:58 AM |
| :::::::FormInfo.java | 40,627 | 6/27/02 5:33 AM |
| :::::::adapters | 7,302 | |
| :::::::::KeyValuePairToAttrNodeAdapter.java | 4,152 | 6/9/03 1:55 PM |
| :::::::::MapToNamedNodeMapAdapter.java | 3,150 | 6/9/03 1:51 PM |
| :::::xml2dbms | 136,181 | |
| :::::::MapConstants.java | 933 | 8/22/01 11:31 AM |
| :::::::Xml2Dbms.java | 40,328 | 7/24/03 9:58 AM |
| :::::::Xml2DbmsException.java | 554 | 1/14/02 9:49 AM |
| :::::imagefiles | 158 | |
| :::::::srcfile.gif | 79 | 11/30/98 7:55 PM |
| :::::::textfile.gif | 79 | 11/30/98 7:56 PM |
| :::::initializationfiles | 94,208 | |
| :::::::blankdb.mdb | 94,208 | 8/9/01 7:24 AM |
| ::::xrover | 601,891 | |
| :::::AbstractAction.java | 17,686 | 7/31/03 1:42 PM |
| :::::AbstractDataContainer.java | 58,793 | 7/24/03 9:58 AM |
| :::::Action.java | 6,310 | 6/19/03 7:21 AM |
| :::::ActionConstants.java | 740 | 7/24/03 9:57 AM |
| :::::ActionFactory.java | 1,683 | 10/4/02 6:32 AM |
| :::::Argument.java | 2,195 | 7/24/03 9:58 AM |
| :::::DataContainer.java | 3,666 | 6/19/03 7:55 AM |
| :::::DataContainerFactory.java | 8,198 | 7/14/03 7:42 AM |
| :::::DataDefinitionCollection.java | 2,324 | 7/24/03 9:57 AM |
| :::::DataDefinitionConstants.java | 2,027 | 7/24/03 9:56 AM |
| :::::DataTypes.java | 4,195 | 7/24/03 12:31 PM |
| :::::DatabaseDataContainerImpl.java | 75,513 | 11/4/02 12:17 PM |
| :::::DatabaseDataDefinitionCollection.java | 6,464 | 11/11/02 5:56 AM |
| :::::DatabaseRootDataContainerImpl.java | 9,741 | 10/10/02 10:19 AM |
| :::::DefaultActionImpl.java | 6,836 | 7/24/03 9:58 AM |
| :::::DefaultDataContainerImpl.java | 9,293 | 7/8/03 9:57 AM |
| :::::DefaultRetriever.java | 18,607 | 9/9/03 1:07 PM |
| :::::DefaultRootDataContainerImpl.java | 8,832 | 7/24/03 9:58 AM |
| :::::DtdFileNotFoundException.java | 1,109 | 7/24/03 9:58 AM |
| :::::EvaluatioriException.java | 649 | 2/24/03 12:39 PM |
| :::::ExtractionErrorException.java | 1,056 | 7/24/03 9:58 AM |
| :::::GlobalConstants.java | 3,482 | 8/12/03 7:11 AM |
| :::::InvalidMapException.java | 753 | 11/29/01 9:02 AM |
| :::::MalformedPlanException.java | 1,828 | 7/24/03 9:58 AM |
| :::::PageID.java | 3,455 | 7/24/03 9:58 AM |
| :::::PageMapInterpreter.java | 147,594 | 8/18/03 10:27 AM |
| :::::ProcessingException.java | 1,022 | 7/24/03 9:58 AM |
| :::::Retriever.java | 5,605 | 9/9/03 1:07 PM |
| :::::RootDataContainer.java | 694 | 9/4/02 3:38 PM |
| :::::SitePathTagConstants.java | 6,654 | 7/24/03 9:58 AM |
| :::::SourcedArgument.java | 1,215 | 7/19/02 5:54 AM |
| :::::UndefinedDataTypeException.java | 1,064 | 7/24/03 9:58 AM |
| :::::plugins | 40,989 | |
| :::::::ERExpressionPlugin.java | 27,220 | 7/24/03 9:58 AM |
| :::::::HTMLTableExtractorPlugin.java | 12,834 | 6/19/03 12:43 PM |
| :::::::Plugin.java | 935 | 7/24/03 9:58 AM |
| :::::util | 141,619 | |
| :::::::DOMParser.java | 40,324 | 7/24/03 9:58 AM |
| :::::::DataContainerDocumentAdapter.java | 19,195 | 10/4/02 7:46 AM |
| :::::::DataContainerLeafNodeAdapter.java | 4,216 | 6/9/03 1:36 PM |
| :::::::DataContainerNodeAdapter.java | 42,940 | 6/2/03 11:11 AM |
| :::::::DataContainerTextAdapter.java | 10,240 | 5/7/03 6:30 AM |
| :::::::Notifier.java | 602 | 8/22/02 7:29 AM |
| :::::::SessionInfoConstants.java | 682 | 5/5/03 10:01 AM |

-continued

| Name | Size | Last Modified |
|---|---|---|
| ::::::XMLException.java | 1,077 | 7/24/03 9:58 AM |
| ::::::XRoverDatabaseFactory.java | 5,697 | 1/16/03 7:58 AM |
| ::::::XRoverUtilities.java | 15,558 | 7/24/03 9:58 AM |
| ::::::XSLException.java | 1,088 | 7/24/03 9:58 AM |
| :ode_oms | 1,108,707 | |
| ::attribute_parser.P | 803 | 1/22/03 9:59 AM |
| ::config_ode_template.P | 3,985 | 5/13/03 6:54 AM |
| ::main.P | 2,622 | 4/7/02 6:54 AM |
| ::ode_classifier | 197,174 | |
| :::images | 1,314 | |
| ::::icon_classifier.gif | 1,314 | 11/5/02 7:30 AM |
| :::ode_classifierGUIConcept.P | 33,048 | 8/4/03 4:42 AM |
| :::ode_classifierGUIExplain.P | 10,897 | 4/23/03 6:37 AM |
| :::ode_classifierGUIObjList.P | 21,340 | 3/28/03 5:46 AM |
| :::ode_classifierGUISearch.P | 17,208 | 8/4/03 4:42 AM |
| :::ode_classifierGUITraining.P | 12,506 | 3/18/03 10:12 AM |
| :::ode_classifierGUIUtils.P | 12,088 | 5/13/03 7:32 AM |
| :::ode_classifierGUIdatactr.P | 897 | 12/12/02 6:32 AM |
| :::ode_classifierGUIinval_dyn.P | 4,325 | 5/19/03 5:49 AM |
| :::ode_classifierGUImain.P | 57,562 | 8/4/03 4:42 AM |
| :::ode_classifierGUIt2t.P | 16,667 | 5/13/03 7:07 AM |
| :::ode_classifierValidation.P | 9,142 | 5/19/03 9:54 AM |
| :::preferences_classifier.P | 180 | 9/9/03 11:57 AM |
| ::ode_defaults.P | 1,092 | 6/13/03 12:25 PM |
| ::ode_domain_types.P | 9,842 | 6/13/03 11:28 AM |
| ::ode_domain_types_cdf.P | 10,356 | 5/19/03 10:39 AM |
| ::ode_dtl.P | 3,304 | 4/7/02 6:54 AM |
| ::ode_editor | 76,169 | |
| :::ode_editorGUIAttribute.P | 9,475 | 6/18/03 9:32 AM |
| :::ode_editorGUIAttributeObject.P | 9,212 | 6/18/03 9:32 AM |
| :::ode_editorGUIConcept.P | 24,898 | 2/24/03 1:03 PM |
| :::ode_editorGUIEditor.P | 6,550 | 5/8/03 1:11 PM |
| :::ode_editorGUIObject.P | 10,218 | 2/19/03 4:48 AM |
| :::ode_editorGUIRelationship.P | 11,820 | 1/24/03 10:55 AM |
| :::ode_editorGUIedit.P | 3,904 | 4/15/03 4:54 AM |
| :::preferences_editor.P | 92 | 6/25/03 10:57 AM |
| ::ode_formatoms.P | 12,246 | 6/12/03 7:43 AM |
| ::ode_genrepsoms.P | 23,103 | 6/18/03 6:39 AM |
| ::ode_init.P | 2,223 | 4/15/03 10:05 AM |
| ::ode_initcdf.P | 2,917 | 5/14/03 1:32 PM |
| ::ode_launcher | 125,383 | |
| :::attributelist.P | 7,064 | 9/9/03 11:33 AM |
| :::attributelistcdf.P | 7,195 | 5/19/03 2:00 PM |
| :::clstree.P | 13,992 | 5/20/03 11:04 AM |
| :::clstreecdf.P | 14,615 | 5/20/03 11:36 AM |
| :::domain_gen.P | 100 | 1/20/03 9:49 AM |
| :::extractor.P | 14,974 | 4/24/03 7:31 AM |
| :::images | 22,308 | |
| ::::about.html | 353 | 6/5/03 11:47 AM |
| ::::icon_odelauncher.gif | 1,307 | 11/5/02 7:30 AM |
| ::::icon_odelauncher.jpg | 1,420 | 10/31/02 11:32 AM |
| ::::odel_splash.jpg | 19,228 | 6/5/03 11:38 AM |
| :::import_batch.P | 9,160 | 3/28/03 1:18 PM |
| :::ode_launcher_io.p | 17,044 | 4/21/03 6:59 AM |
| :::ode_validator.P | 2,762 | 9/9/03 11:31 AM |
| :::replacements_gen.P | 1,323 | 1/20/03 9:49 AM |
| :::settings.P | 1,803 | 9/20/02 6:00 AM |
| :::source_oms_info.P | 2,771 | 5/22/03 6:45 AM |
| :::tableview.P | 5,349 | 4/9/03 6:09 AM |
| :::xjode.P | 4,923 | 5/9/03 7:26 AM |
| ::ode_nclassifier.P | 31,565 | 5/13/03 7:07 AM |
| ::ode_parser.P | 14,477 | 6/11/03 7:03 AM |
| ::ode_parsercdf.P | 14,326 | 5/19/03 1:50 PM |
| ::ode_props.P | 784 | 4/7/02 6:54 AM |
| ::ode_utils.P | 13,891 | 3/28/03 10:38 AM |
| ::ode_utilscdf.P | 13,947 | 5/16/03 1:01 PM |
| ::odeconstructor | 522,007 | |
| :::class_documentation.P | 1,631 | 4/11/03 11:23 AM |
| :::clstree.P | 17,755 | 8/4/03 10:49 AM |
| :::com | 200,550 | |
| ::::xsb | 200,550 | |
| :::::odeconstructor | 186,480 | |
| ::::::AttributeValueShow.form | 4,055 | 3/21/03 7:44 AM |
| ::::::AttributeValueShow.java | 4,143 | 3/21/03 7:44 AM |
| ::::::ConstructorPanel.form | 5,347 | 5/13/03 9:56 AM |
| ::::::ConstructorPanel.java | 17,872 | 5/13/03 9:56 AM |
| ::::::DBLoginValidator.java | 2,533 | 3/28/03 7:09 AM |
| ::::::ExpandablePanel.form | 2,277 | 8/7/02 10:00 AM |
| ::::::ExpandablePanel.java | 6,802 | 8/7/02 10:00 AM |
| ::::::FileFilters.java | 2,731 | 7/23/02 12:24 PM |
| ::::::FindTextDialog.form | 6,859 | 1/27/03 7:05 AM |

-continued

| Name | Size | Last Modified |
|---|---|---|
| ::::::FindTextDialog.java | 7,663 | 1/27/03 7:05 AM |
| ::::::GTOptionChooser.form | 6,598 | 3/14/02 9:37 AM |
| ::::::GTOptionChooser.java | 11,499 | 3/14/02 9:37 AM |
| ::::::GTWrapper.java | 889 | 7/2/02 5:42 AM |
| ::::::ODEDesktop.java | 24,330 | 5/13/03 10:03 AM |
| ::::::OptionChooser.form | 6,598 | 2/14/02 7:00 AM |
| ::::::OptionChooser.java | 10,598 | 2/14/02 7:00 AM |
| ::::::PageViewer.java | 22,135 | 5/1/03 12:45 PM |
| ::::::Settings.java | 1,707 | 4/1/03 11:57 AM |
| ::::::TokenPane.form | 2,862 | 2/27/02 4:37 AM |
| ::::::TokenPane.java | 8,186 | 2/27/02 4:37 AM |
| ::::::dbview | 30,796 | |
| :::::::DBPanel.form | 520 | 5/2/03 5:13 AM |
| :::::::DBPanel.java | 5,476 | 5/2/03 5:13 AM |
| :::::::DBView.form | 8,570 | 5/13/03 2:01 PM |
| :::::::DBView.java | 10,951 | 5/13/03 2:01 PM |
| :::::::QueryTableModel.java | 5,279 | 5/17/02 4:46 AM |
| :::::oms | 5,778 | |
| ::::::Concept.java | 1,313 | 12/12/01 5:56 AM |
| ::::::OMSConstants.java | 1,107 | 4/22/02 12:38 PM |
| ::::::OMSInterface.java | 3,358 | 5/9/03 5:19 AM |
| :::::util | 8,292 | |
| ::::::SortedComboBoxModel.java | 2,262 | 12/12/01 5:59 AM |
| ::::::SortedListModel.java | 2,793 | 5/17/02 4:52 AM |
| ::::::SortedTableModel.java | 3,237 | 12/12/01 5:50 AM |
| ::::condition__editor.P | 19,655 | 6/6/03 6:37 AM |
| ::::domain__inferer.P | 8,174 | 6/23/02 11:35 AM |
| ::::domaineditor.P | 23,415 | 1/30/03 7:25 AM |
| ::::explanations.P | 5,959 | 4/7/03 9:09 AM |
| ::::export__ont.P | 6,865 | 5/9/03 7:47 AM |
| ::::extractor__view.P | 927 | 5/1/03 12:44 PM |
| ::::guis.P | 11,634 | 4/7/03 9:09 AM |
| ::::images | 25,243 | |
| :::::A-table.gif | 358 | 3/17/03 12:34 PM |
| :::::Qtable.gif | 346 | 3/17/03 12:34 PM |
| :::::about.html | 365 | 6/5/03 11:47 AM |
| :::::icon__odeconstructor__line.gif | 934 | 11/6/02 5:56 AM |
| :::::icon__odeconstructor__line.jpg | 899 | 11/6/02 5:43 AM |
| :::::icon__odeconstructor__line32.gif | 1,167 | 11/5/02 7:29 AM |
| :::::icon__odeconstructor__line32.jpg | 1,480 | 10/31/02 11:14 AM |
| :::::odec__splash.jpg | 19,556 | 6/5/03 11:35 AM |
| :::::text.gif | 138 | 3/28/03 7:21 AM |
| ::::ode__domain__types.P | 9,704 | 6/16/03 5:01 AM |
| ::::ode__extr__utils.P | 9,201 | 5/1/03 1:10 PM |
| ::::odec__utils.P | 20,301 | 5/9/03 7:49 AM |
| ::::odeconstructor__init.P | 13,109 | 6/13/03 12:33 PM |
| ::::odetypes | 10,464 | |
| :::::data__omsext.P | 386 | 4/22/02 12:55 PM |
| :::::schema__omsext.P | 10,078 | 4/15/03 10:33 AM |
| ::::rel__rules__editor.P | 31,644 | 4/8/03 11:08 AM |
| ::::rellist.P | 40,012 | 6/12/03 1:19 PM |
| ::::rule__templates.P | 21,164 | 4/1/03 6:31 AM |
| ::::type__rules__editor.P | 15,692 | 4/24/03 7:34 AM |
| ::::typetree.P | 12,480 | 4/28/03 7:13 AM |
| ::::value__abbreviations.P | 13,329 | 8/4/03 10:49 AM |
| ::::xjode.P | 3,099 | 6/5/03 9:29 AM |
| :::odescan.P | 6,106 | 1/7/03 11:54 AM |
| ::suptok.P | 20,385 | 7/31/03 8:10 AM |
| :oms__matcher | 1,866,107 | |
| ::bin | 7,255 | |
| :::build.xml | 7,255 | 8/18/03 1:57 PM |
| ::changelog | 28,992 | 8/14/03 6:06 AM |
| ::generic__matcher.__bat | 1,058 | 8/18/03 1:54 PM |
| ::generic__matcher.c | 861 | 1/3/03 7:34 AM |
| ::images | 347,813 | |
| :::About16.gif | 644 | 8/26/02 5:04 AM |
| :::AppIcon16.jpg | 900 | 11/6/02 5:55 AM |
| :::AppIcon32.gif | 1,249 | 11/5/02 7:30 AM |
| :::ContextualHelp16.gif | 198 | 3/20/00 5:14 AM |
| :::Delete16.gif | 208 | 8/26/02 5:04 AM |
| :::Empty16.gif | 832 | 9/12/02 7:33 AM |
| :::GreenLed13.gif | 142 | 8/6/00 11:22 PM |
| :::Import16.gif | 311 | 8/26/02 5:04 AM |
| :::Information16.gif | 661 | 9/19/02 12:55 PM |
| :::Open16.gif | 228 | 8/26/02 5:04 AM |
| :::Preferences16.gif | 207 | 8/26/02 5:04 AM |
| :::RedLed13.gif | 142 | 8/6/00 11:22 PM |
| :::Refresh16.gif | 244 | 9/19/02 12:55 PM |
| :::Remove16.gif | 213 | 3/20/00 5:15 AM |
| :::Save16.gif | 206 | 8/26/02 5:04 AM |

-continued

| Name | Size | Last Modified |
|---|---|---|
| ::::Save24.gif | 266 | 3/20/00 5:15 AM |
| ::::SaveAll16.gif | 252 | 8/26/02 5:04 AM |
| ::::SaveAll24.gif | 334 | 3/20/00 5:15 AM |
| ::::SaveAs16.gif | 255 | 8/26/02 5:04 AM |
| ::::Status16.gif | 423 | 3/20/00 5:15 AM |
| ::::Zoom16.gif | 303 | 3/20/00 5:15 AM |
| ::::splash_window.bmp | 300,054 | 4/18/03 1:13 PM |
| ::::splash_window.gif | 16,751 | 11/7/02 5:51 AM |
| ::::splash_window.jpg | 22,790 | 2/28/03 5:36 PM |
| ::looks.jar | 317,029 | 8/8/03 7:54 AM |
| ::matcher_docs | 821,648 | |
| :::index.html | 2,620 | 9/30/02 9:10 AM |
| :::man_pages | 818,921 | |
| ::::CVS | 689 | |
| :::::Entries | 590 | 7/18/03 10:11 AM |
| :::::Repository | 54 | 9/20/02 7:23 AM |
| :::::Root | 45 | 5/20/03 6:23 AM |
| ::::images | 788,176 | |
| :::::CVS | 639 | |
| ::::::Entries | 533 | 7/18/03 10:11 AM |
| ::::::Repository | 61 | 9/20/02 7:23 AM |
| ::::::Root | 45 | 5/20/03 6:23 AM |
| :::::desc.jpg | 59,907 | 11/5/02 11:48 AM |
| :::::detail_results.jpg | 214,120 | 11/5/02 11:53 AM |
| :::::help.jpg | 109,501 | 9/23/02 8:37 AM |
| :::::menus.jpg | 18,901 | 9/19/02 12:55 PM |
| :::::newclass.jpg | 17,766 | 9/23/02 7:42 AM |
| :::::newrel.jpg | 13,783 | 9/23/02 7:57 AM |
| :::::prefs.jpg | 39,660 | 11/5/02 11:46 AM |
| :::::results.jpg | 60,636 | 11/5/02 11:49 AM |
| :::::right_panel.jpg | 119,989 | 9/19/02 12:55 PM |
| :::::select_obj.jpg | 93,861 | 9/30/02 9:19 AM |
| :::::trees.jpg | 39,413 | 9/19/02 12:55 PM |
| ::::page1.html | 742 | 9/26/02 6:42 AM |
| ::::page10.html | 1,349 | 9/26/02 6:42 AM |
| ::::page11.html | 4,731 | 11/5/02 12:59 PM |
| ::::page12.html | 1,074 | 11/5/02 12:25 PM |
| ::::page13.html | 3,144 | 9/30/02 8:29 AM |
| ::::page2.html | 1,391 | 9/26/02 6:41 AM |
| ::::page3.html | 1,932 | 9/26/02 6:41 AM |
| ::::page4.html | 4,755 | 9/30/02 9:21 AM |
| ::::page5.html | 1,106 | 9/26/02 6:41 AM |
| ::::page6.html | 1,488 | 11/5/02 12:57 PM |
| ::::page7.html | 3,743 | 11/5/02 12:27 PM |
| ::::page8.html | 3,110 | 11/5/02 1:03 PM |
| ::::page9.html | 1,491 | 9/26/02 6:41 AM |
| :::matcher_images | 107 | |
| ::::CVS | 107 | |
| :::::Entries | 3 | 9/20/02 7:23 AM |
| :::::Repository | 59 | 9/20/02 7:23 AM |
| :::::Root | 45 | 5/20/03 6:23 AM |
| ::matcher_fx | 101,080 | |
| :::compare_measures.P | 7,213 | 11/8/02 11:59 AM |
| :::equals.P | 333 | 9/5/03 1:14 PM |
| :::lcs | 1,706 | |
| ::::CVS | 143 | |
| :::::Entries | 52 | 7/18/03 10:11 AM |
| :::::Repository | 46 | 9/20/02 7:23 AM |
| :::::Root | 45 | 5/20/03 6:23 AM |
| ::::common_tokens.P | 1,563 | 9/19/02 12:57 PM |
| ::::least_common_subseq.P | 4,632 | 11/8/02 11:59 AM |
| ::::match_function_interface.P | 4,313 | 2/28/03 11:10 AM |
| ::::match_object_interface.P | 16,446 | 8/14/03 5:58 AM |
| ::::matcher.P | 14,388 | 9/5/03 1:15 PM |
| ::::matcher.P.old | 16,451 | 2/6/03 8:10 AM |
| ::::matcher_progress.P | 741 | 2/19/03 6:26 AM |
| ::::notequals.P | 489 | 1/3/03 1:26 PM |
| :::phone_fax.P | 7,413 | 11/11/02 12:35 PM |
| ::::removedup.P | 146 | 1/2/03 5:10 AM |
| :::tmp | 13,983 | |
| ::::matcher_lite.P | 13,348 | 11/6/02 9:27 AM |
| :::::notequals.P | 489 | 11/11/02 6:56 AM |
| :::::removedup.P | 146 | 11/11/02 6:56 AM |
| :::trie_matcher.P | 4,779 | 11/8/02 11:59 AM |
| :::xj_matcher_progress.P | 1,107 | 4/25/03 2:06 PM |
| :::zip_code.P | 6,940 | 11/8/02 11:59 AM |
| ::matcher_gui | 216,003 | |
| :::logger_config.P | 578 | 5/8/03 10:30 AM |
| :::matcher_func.P.102302 | 10,319 | 11/15/02 9:09 AM |
| :::matcher_fxconfig.P | 3,706 | 2/28/03 11:10 AM |
| :::matcher_import.P | 4,460 | 11/11/02 12:35 PM |

| Name | Size | Last Modified |
|---|---|---|
| ::::matcher_io.P | 10,655 | 2/28/03 11:10 AM |
| ::::matcher_main.P | 39,687 | 9/5/03 1:16 PM |
| ::::matcher_match.P | 9,285 | 4/29/03 2:07 PM |
| ::::matcher_nodes.P | 7,125 | 4/22/03 12:59 PM |
| ::::matcher_obj_panel.P | 6,314 | 4/22/03 1:02 PM |
| ::::matcher_panel_utils.P | 2 | 3/14/03 6:58 AM |
| ::::matcher_panels.P | 22,244 | 8/14/03 6:02 AM |
| ::::matcher_pprules.P | 26,649 | 4/22/03 1:02 PM |
| ::::matcher_prefs.P | 16,954 | 2/28/03 11:10 AM |
| ::::matcher_result_panels.P | 16,375 | 9/5/03 1:14 PM |
| ::::matcher_tests.P | 2,263 | 1/21/03 11:55 AM |
| ::::matcher_utils.P | 19,016 | 8/14/03 6:03 AM |
| ::::matcher_validation.P | 20,371 | 4/24/03 7:41 AM |
| ::matcher_omsext | 18,083 | |
| ::::data_omsext.P | 898 | 3/21/03 12:51 PM |
| ::::schema_omsext.P | 8,166 | 4/25/03 12:41 PM |
| ::::schema_omsint.P | 9,019 | 1/28/03 5:03 AM |
| ::::runMatcherMain.bat | 816 | 8/14/03 6:25 AM |
| ::xsb_compiler.P | 937 | 3/4/03 6:53 AM |
| :utils | 64,747 | |
| ::marginals.P | 1,081 | 6/11/03 6:22 AM |
| ::morphology.P | 3,608 | 8/5/03 1:48 PM |
| ::repl_code.P | 2,488 | 6/21/00 2:49 PM |
| ::singularize_table.P | 5,763 | 7/28/03 4:43 AM |
| ::stdscan.P | 5,850 | 3/24/00 11:34 AM |
| ::stdspell.P | 2,157 | 3/24/00 11:34 AM |
| ::stdsupertok.P | 9,624 | 5/31/02 6:46 AM |
| ::stdutils.P | 29,802 | 8/4/03 4:42 AM |
| ::updateOs.P | 1,633 | 3/2/01 5:34 AM |
| ::wnutils.P | 1,236 | 9/13/00 7:31 AM |
| ::xed.P | 79 | 10/5/00 3:44 PM |
| ::xeddis.H | 38 | 10/5/00 3:44 PM |
| ::xeddis.c | 1,388 | 10/5/00 3:44 PM |
| :wordnet | 28,864,348 | |
| ::eurika.P | 2,075 | 8/23/00 6:55 AM |
| :extractorGUI.P | 8,378 | 8/23/00 6:55 AM |
| ::id_trans.P | 2,978,154 | 8/23/00 6:55 AM |
| ::prog.P | 4,917 | 8/23/00 6:55 AM |
| ::queries.P | 11,815 | 8/23/00 6:55 AM |
| ::wn_ant.P | 176,876 | 8/23/00 6:55 AM |
| ::wn_at.P | 23,388 | 8/23/00 6:55 AM |
| ::wn_cs.P | 4,032 | 8/23/00 6:55 AM |
| ::wn_ent.P | 8,113 | 8/23/00 6:55 AM |
| ::wn_fr.P | 318,722 | 8/23/00 6:55 AM |
| ::wn_g.P | 8,486,856 | 8/23/00 6:55 AM |
| ::wn_hyp.P | 1,464,815 | 8/23/00 6:55 AM |
| ::wn_mm.P | 206,122 | 8/23/00 6:55 AM |
| ::wn_mp.P | 122,849 | 8/23/00 6:55 AM |
| ::wn_ms.P | 12,741 | 8/23/00 6:55 AM |
| ::wn_per.P | 164,249 | 8/23/00 6:55 AM |
| ::wn_ppl.P | 2,070 | 8/23/00 6:55 AM |
| ::wn_preds.P | 3,539 | 8/23/00 6:55 AM |
| ::wn_s.P | 5,345,081 | 8/23/00 6:55 AM |
| ::wn_sa.P | 73,550 | 8/23/00 6:55 AM |
| ::wn_sim.P | 416,119 | 8/23/00 6:55 AM |
| ::wn_su.P | 5,545,110 | 8/23/00 6:55 AM |
| ::wn_su2.P | 3,474,840 | 7/25/03 12:25 PM |
| ::wn_vgp.P | 9,937 | 8/23/00 6:55 AM |
| :xjcdfwidgets | 225,785 | |
| ::abbreviationPanel.P | 8,110 | 8/29/03 9:37 AM |
| ::abbreviationPanel_calls.P | 29,663 | 8/29/03 10:26 AM |
| ::addRelation.P | 2,899 | 8/4/03 4:42 AM |
| ::cdfDisplayUtils.P | 1,235 | 7/17/03 2:21 PM |
| ::cdf_validation | 63,902 | |
| ::::samplerData.P | 11,574 | 6/6/03 10:37 AM |
| ::::samplerData_lq.P | 13,192 | 7/3/03 6:57 AM |
| ::::validationGuiTemplates.P | 39,136 | 9/9/03 12:17 PM |
| ::componentWidgets.P | 8,891 | 9/2/03 11:49 AM |
| ::delimiterchoice.P | 869 | 7/24/03 11:45 AM |
| ::desktop_utils.P | 4,764 | 8/12/03 4:41 AM |
| ::export_format_calls.P | 12,799 | 7/16/03 11:43 AM |
| ::export.mask_editor.P | 2,974 | 7/31/03 10:23 AM |
| ::export_objects.P | 15,394 | 8/1/03 1:18 PM |
| ::external_form.P | 5,977 | 8/8/03 8:11 AM |
| ::import_objects.P | 17,634 | 7/28/03 5:17 AM |
| ::inference_rules.p | 7,667 | 8/12/03 1:47 PM |
| ::rel_widget.P | 13,948 | 7/15/03 6:54 AM |
| ::showProperties.P | 9,538 | 8/4/03 4:42 AM |

-continued

| Name | Size | Last Modified |
|---|---|---|
| ::suptokParseTreeGui.P | 5,418 | 7/25/03 10:03 AM |
| ::toolbar_widget.P | 9,596 | 8/8/03 9:18 AM |
| ::tree_templates. P | 4,507 | 8/4/03 4:42 AM |

DETAILED DESCRIPTION OF THE PREFERRED EMBODIMENTS

Turning now to FIG. 1, a web agent creator 10 according to the invention includes a user interface 12 based on a web browser, an XPath discovery algorithm 14, a results editor 16, an agent generator 18, and a form value editor 20. The user interface 12 is based on "Webclient", a java embedding interface of the Mozilla web browser. The user interface 12 communicates with the other components to provide the nodes of the document object model (DOM) that correspond to the text selected in the user interface. The XPath discovery algorithm 14 supplies an XPath to the agent generator 18 via the results editor 16. The XPath is used by the agent 22 to extract the highlighted information as well as similar information from the page. Those skilled in the art will appreciate that an XPath is one type of a pattern expression and that the discovery algorithm 14 can be adapted to work with any type of pattern expression.

Given a collection of XPath expressions, the results editor 16 extracts matching text from the page and displays this text in a table. The user can then provide names for the columns of data in the table, choose to ignore data columns, or supply examples of undesirable data that were erroneously extracted.

The agent generator 18 is used to build the agent 22 based on where the user has navigated in the web browser user interface 12 and the settings the user has provided in the results editor 16. The agent generator 18 uses DOM events to determine what the user is doing. In addition, the agent generator 18 enforces rules that ensure an invalid agent is not created. For example, users are not allowed to follow a link on a page unless they have created an XPath to extract that link (which the agent will use to locate the link). The agent generator 18 also warns the user when a page is encountered that contains formatting that is not supported by the agent, e.g. frames or JavaScript.

When a user submits a form on a web site, the form value editor 20 displays all the parameters of the form that will be submitted and allows the user to set options for the agent 22 when it submits the form. Options include which form parameters to submit and whether the value should remain constant or is supplied dynamically while the agent is running (e.g. from a database).

From the foregoing, those skilled in the art will appreciate that the heart of the web agent builder 10 is the XPath discovery algorithm. The algorithm uses examples provided by the user to discover an XPath expression that will extract all of the highlighted data as well as similar data from the DOM tree representing the HTML page. For example if the user highlights a fragment of a table then the XPath expression learned from this fragment will extract all the elements in the table.

Figure 2:
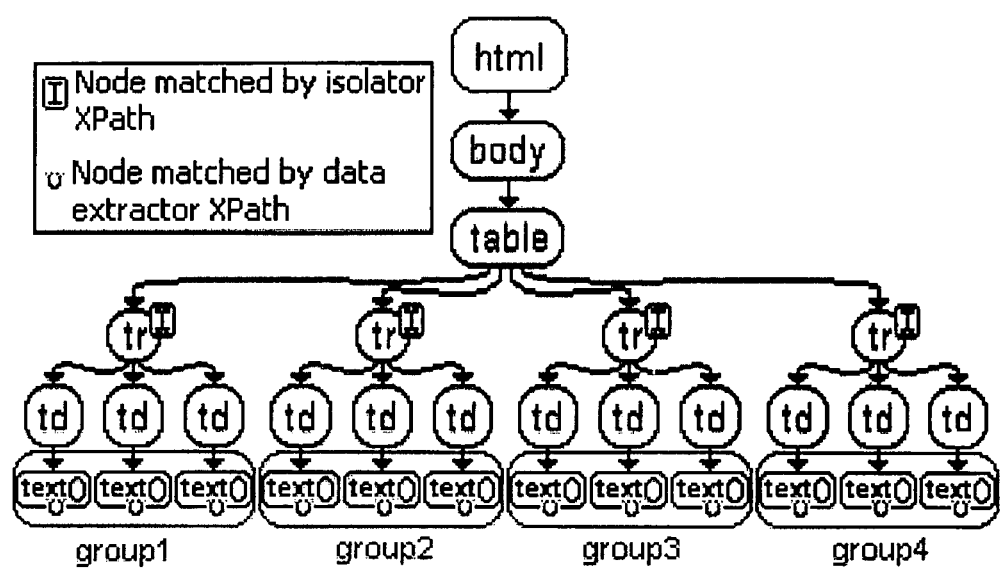
FIG. 2 is a schematic illustration illustrating the concepts of the XPath discovery algorithm of the web agent creator.

Conceptually, the data items in a web page can be partitioned into different sets of homogeneous records. For example, a table row or a list element in the document can be considered as a record and all the rows in a table as a set of homogeneous records. To identify such records, certain types of DOM tree elements are designated as grouping nodes (e.g. <tr> and <li>). From the highlighted examples, the agent creator 10 learns a set of data extractor XPath expressions to locate data items rooted under grouping nodes. However, such an expression can be very general and will match unrelated data items. For example, if the user highlights a fragment of a table from which he wishes to extract data and the document contains two tables then the data extractor expression can potentially match the data elements in the rows of both the tables. One can avoid matching unwanted data by confining the scope of applicability of the data extractor expression to subtrees that contain the desired data. To locate such subtrees certain elements in the DOM tree are designated as locator nodes. The grouping nodes in the subtree rooted at a locator node contain related data items. E.g. a <table> element is a locator node since all the rows in a table occur as grouping nodes in its subtree. The XPath discovery algorithm learns an isolator XPath expression to isolate each grouping node occurring in the subtree rooted at the locator node. The data extractor expressions are then applied separately to each subtree rooted at a grouping node. Hence, these isolator expressions serve to group the nodes matched by the data extractor expressions (such as all the <tr>'s in a <table>). The set of nodes that were found by applying the data extractor expressions on a document from a given grouping node are considered to be part of the same group, or record (e.g. all the data items in a <tr>). FIG. 2 illustrates this concept.

In FIG. 2 the <tr>'s are grouping nodes and <table> is the locator node. It is also important to note that isolator expressions serve to make data extraction expressions resilient. This is because the context for applying them is confined to a particular region (defined by the locator node) and is hence immune to changes that occur in a web document that is outside this region.

As an illustration, assume that the user highlights the text region corresponding to the leaf nodes in FIG. 2. Then the isolator XPath that will be generated by the XPath discovery algorithm will be //table/tr and the set of data extractor expressions will be ./td[1]/text( ), ./td[2]/text( ), and ./td[3]/text( ). The isolator expression will match any node that is labeled <tr> and is the immediate child of a node labeled <table>. FIG. 2 illustrates what is matched by these expressions and how the results are logically grouped. It should be noted that both isolator and data extraction expressions are learned from the same set of examples.

The learning algorithm takes as its input a set of nodes corresponding to the highlighted items in the web browser user interface, identifies the locator and grouping nodes based on these data items and learns the corresponding data extractor and isolator expressions. These expressions form the essence of a navigation map for the web agent (22 in FIG. 1). When the web agent is launched these expressions are applied to a page as follows:

First the web agent will find all nodes that match the isolator expression. This will identify the grouping nodes under a locator node.

Second, for each such matched grouping node, the web agent will find a match for each of the data extractor expressions applied from the matched node. This will extract all of the related items within the subtree rooted at the locator node.

The navigation map built using the web agent creator (FIG. 1) is an XML document consisting of one or more page maps as well as a series of actions that interconnect the page maps. Each page map includes isolator and extractor XPath expressions indicating which parts of a web page contain meaningful information to be extracted, along with basic formatting information for formatting output. Actions can be defined to follow links or to fill out forms as necessary to reach the page(s) containing the desired data.

Figure 3:
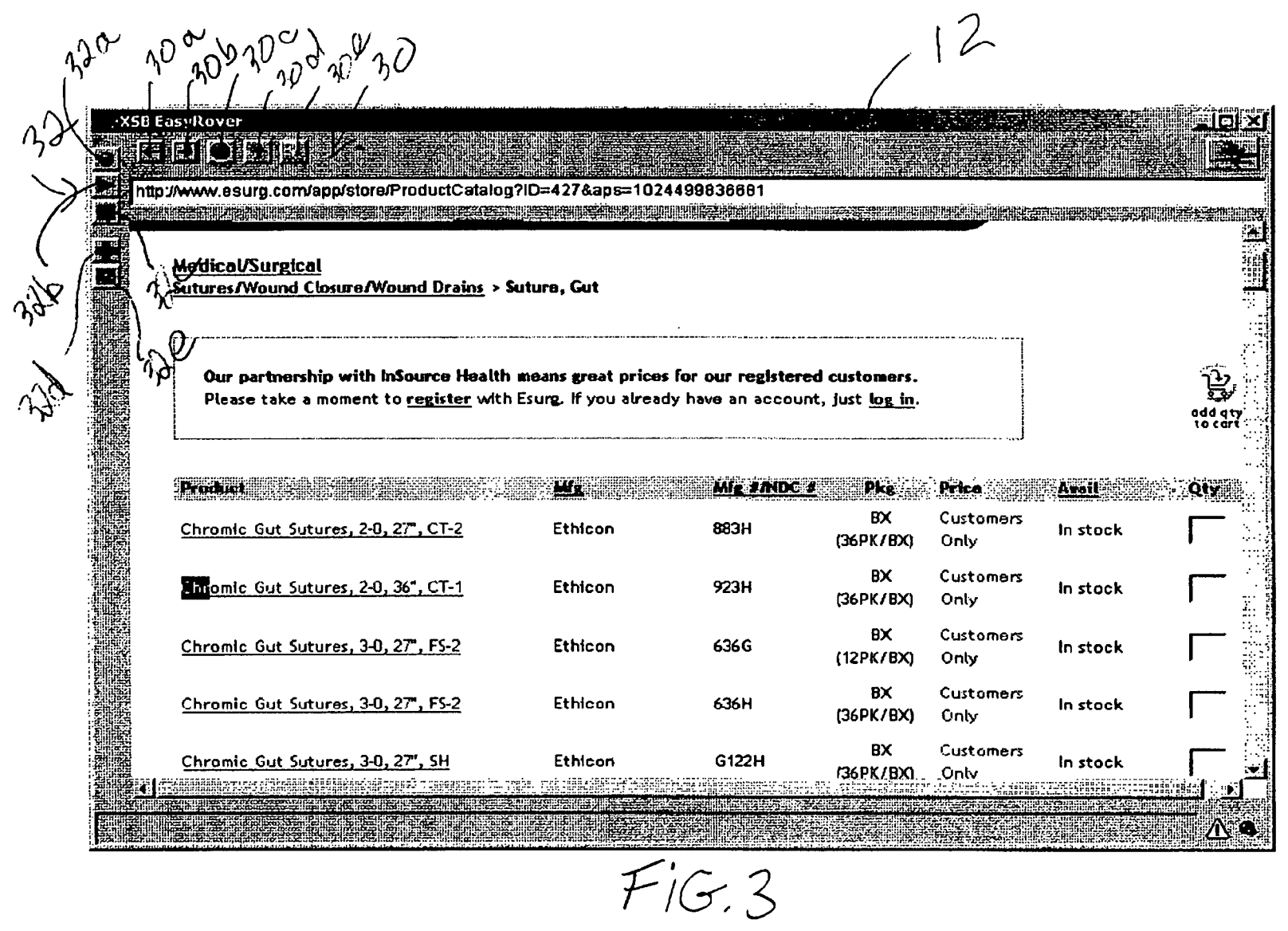

When a web agent (22 in FIG. 1) is launched, the agent interprets the map, performs the actions indicated and formats the extracted data as called for in the map. According to the presently preferred embodiment, the output formats include XML and MS Access Database format, either of which may be selected by the user during the creation of the web agent. FIG. 3 is a screen shot illustrating the main user interface for the web agent creator.

Turning now to FIG. 3, the web browser interface 12 of the web agent creator has two toolbars: a horizontal toolbar 30 and a vertical toolbar 32. The horizontal toolbar 30 is similar to a standard web browser having back and forward buttons, 30*a*, 30*b* respectively, a stop loading button 30*c*, and a refresh page button 30*d*. Button 30*e* is a browser security button which allows the user to specify information about security settings, proxy servers, etc. The vertical toolbar 32 includes web agent creation functions. The button 32*a* begins the process of creating and recording an agent. The button 32*b* launches and executes agents. The button 32*c* stops the agent creation process. The button 32*d* allows the user to add an example of the types of information to be extracted by the agent. The button 32*e* shows the results of data extraction in the form of a table.

FIGS. 4*a*-4*d* illustrate the steps involved in creating a web agent with a web agent creator according to the invention. Starting at FIG. 4*a*, the user enters the URL of a web site containing data of interest, and the page corresponding to the URL is then loaded. Next, the user instructs the web agent creator to start recording the user's actions by clicking on the button 32*a*. The user follows a link in FIG. 4*a* to the page containing data of interest, e.g. the page shown in FIG. 4*b*. The web agent creator records that this link must be taken and then loads the corresponding page.

When the page containing data of interest is displayed, the user highlights a sample of the data for extraction as shown by the highlighting in FIG. 4*b*. From this highlighted fragment, the XPath discovery algorithm learns a set of Xpath expressions and displays all of the data items that it matches in the page as shown in FIG. 4*c*. At this point the user can add more examples by clicking button 32*d*, start over by clicking button 32*a*, or save the agent by clicking the button 32*c*

Figure 4A:
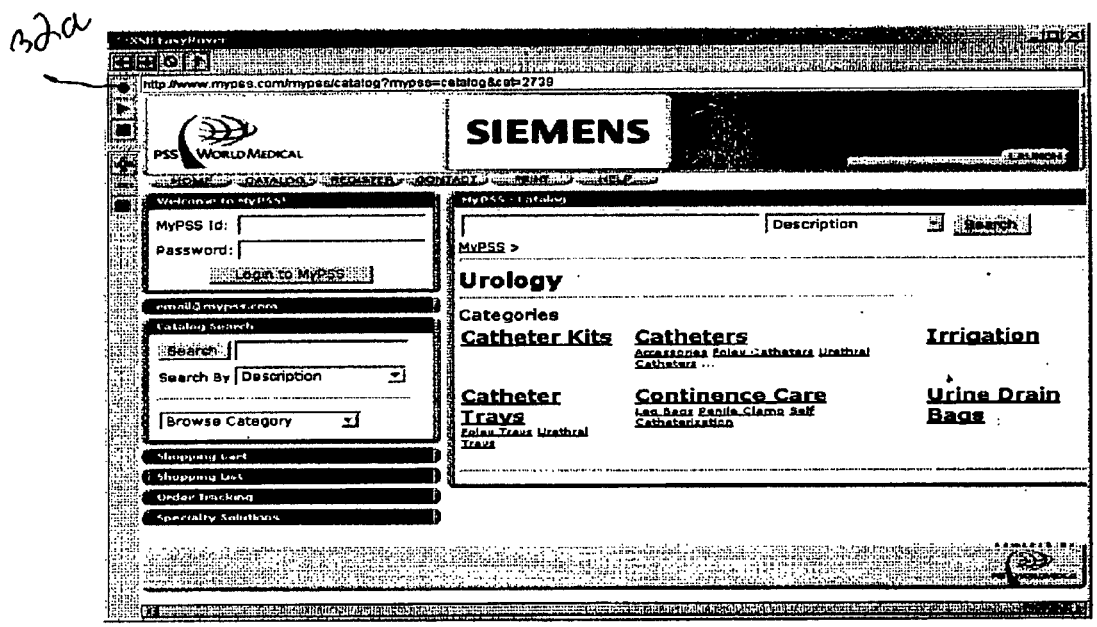
FIGS. 4a-4d are screen shots illustrating the operation of the web agent creator.
Figure 4K:
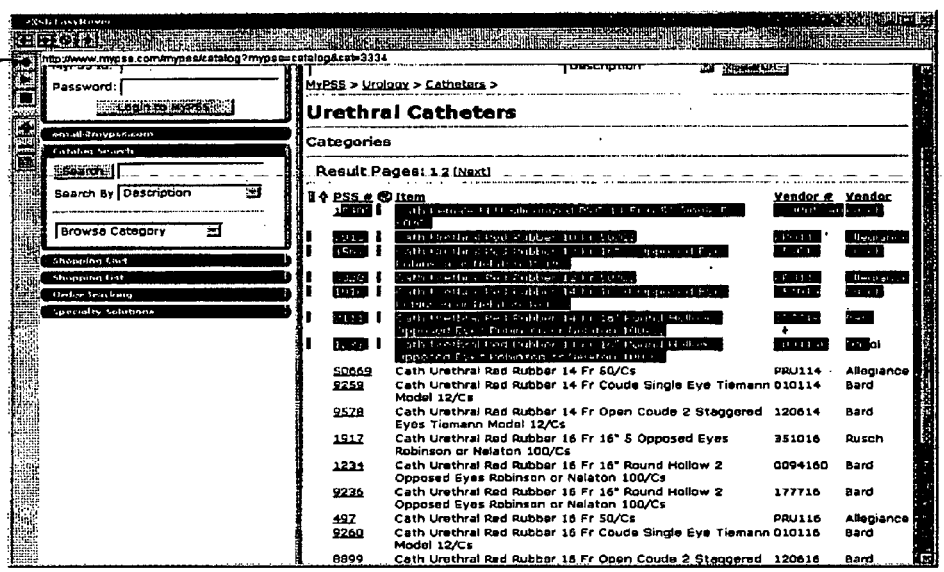
Figure 4D:
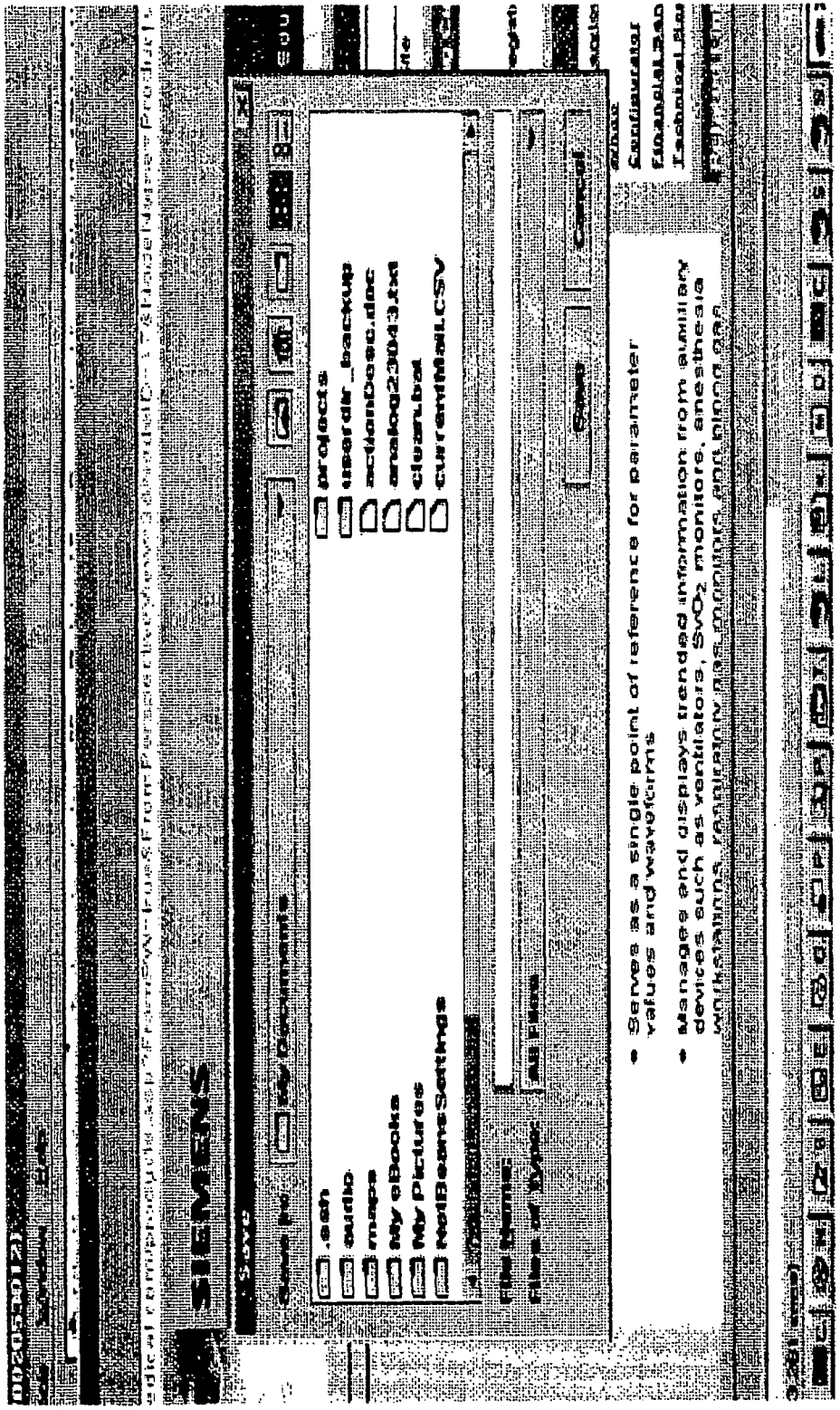

The Xpath expressions learned by the XPath discovery algorithm depend on the region of the page highlighted by the user. By adjusting the highlighted region the user can quickly generate an expression that will exactly match all of the items of interest. When the user is ready to save the agent by clicking on button 32*c*, recording is terminated, the navigation map is generated and the save dialog box is displayed as shown in FIG. 4*d*. The navigation map encodes information about the links to be followed to navigate to this page and the Xpath expression that will be applied to the page for extracting the data of interest.

To extract data from a web site the agent built for that site must be launched. According to an alternate embodiment of the invention, a separate agent manager runs the agent by interpreting the agent's site map. The agent manager is a powerful Java based desktop tool for managing and executing a society of agents. The agent manager allows the user to add, delete, and schedule agents to run at user specified times and with a given regularity. This tool also enables the user to specify the input and output of the completed agent tasks and have them presented and stored in a structured and coherent fashion on the user's desktop. The agent manager has a task wizard that steps users through selecting an agent, determining data input and output locations, and specifying when and how often a task should be performed. The agent manager also has a preferences dialog box where users can set parameters for their agent operations including the agent directory, the task directory, security settings, and proxy settings.

The tools of the invention also include a text extractor tool for extracting semi-structured data, such as tabular data from text documents residing locally or over the Internet. Those familiar with text files, particularly text files which were created by scanning a paper document, will appreciate that tabular data is not structured with easily recognizable delimiters. For example, a structured table in a word processing document, e.g. MS Word, normally delimits columns with tabs and rows with carriage returns. Columns of tabular data in text documents are often separated by a non-constant number of spaces. FIG. 5 is an example of financial data presented as a table in an unstructured text form.

Referring now to FIG. 5, extracting text data from text tables that are irregular poses several difficulties. In broad terms, irregularity is characterized by variable length data items (perhaps spanning multiple words) that possibly overlap with items in neighboring columns. For example in FIG. 5, the item "BERKSHIRE HATHAWAY INC DEL CL" in the 1st column (under header "NAME OF ISSUER") of the 7th row overlaps with the item "COMMON STOCK" in the 2nd column (under header "TITLE OF CLASS") of the 1st row. Such irregularities arise during machine conversion of data from one format into another. For example when pdf documents are converted into text form using xpdf, the text tables corresponding to their pdf counterparts appear drastically misaligned.

A simple approach for extracting items is to find fixed separators between successive columns. Intuitively, a fixed separator is a unique position (with spaces running through all the rows at that position) that distinguishes items occurring in a pair of neighboring columns. As shown in FIG. 5, it is not always possible to find fixed separators. Even if fixed separators exist, it is unclear how they can unambiguously separate columns that have multiword items (e.g. column 1 in FIG. 5).

Another technique that is sometimes used for extracting data from text is based on regular expressions. Regular expressions specify patterns that occur in text and a regular expression processing engine extracts pieces of text that match the specified patterns. Although regular expression based extractors are powerful when dealing with text processing in general, they are quite cumbersome and difficult to use in the presence of tables consisting of items that span several words and/or overlap with items in other columns.

Although the columns in FIG. 5 are not delimited by fixed separators, by visual inspection a casual observer can still correctly associate each item with its corresponding column. This is because all of the items belonging to a column, despite having irregular alignments, appear clustered more "closely" to each other than to items appearing in different columns. Although such clusters can be clearly discerned by a human observer, making them machine recognizable is the key to robust automated extraction of data items from text-based tables.

Clustering enables the present invention to make associations between items in a column based not merely on examining items in adjacent rows but across all of the rows in the table. This means that even though an item in a row may not appear to be in the correct column when examined in isolation (due to misalignments), when viewed in the context of all the rows it can be associated with the correct column (e.g. "CL"

in the 7th row appears to be in the 2nd column although its correct association is the 1st column). Although clustering techniques abound in the literature for various application domains such as data mining, information retrieval, and image processing, its use in text table extraction has not been previously explored.

Given the rows of a text table as the input, the text extractor of the present invention associates items in the table with their corresponding columns using a clustering based algorithm. Each line is broken down into a set of tokens, each of these tokens being a contiguous sequence of non-space characters. Based on the positions of these characters in the line, a center for every token is computed. The center of any token in a cluster is assumed to always be closer to the center of some other token in the same cluster than it is to a token in an adjacent cluster. Inter-cluster gaps are the spaces between the end tokens in adjacent clusters. Starting with an initial partitioning of the set of tokens into clusters, the partition gets refined in every iteration. Refinement amounts to creating larger clusters by merging adjacent clusters based on inter-cluster gaps. The text extraction algorithm terminates when no further refinement is possible.

A text extractor of the invention is implemented in Java and consists of approximately about 3000 lines of code. The clustering algorithm assumes that each column is associated with a unique header, each header being a string consisting of one or more words, abbreviations or numbers. Typically, the text table can be logically separated into two consecutive regions, namely the header region consisting of all the headers followed by the data region. The header region may span multiple lines and the two regions are separated by special tokens, which may include spaces. The user supplies a list of keywords appearing in the headers as well as the separator tokens. Prior to invoking the clustering algorithm, the text extractor performs header discovery to identify the headers of the columns in the table.

The clustering algorithm of the invention can also be used to find tables in a text document using a closeness metric between rows and the spatial location of gaps in the lines. Based on this metric and the observation that rows in a table are clustered together, the iterative clustering algorithm described above can be used to detect tables as well as extract structured data from them.

In product and financial data domains tables typically are generated from templates. The user-defined parameters, based on sample text tables, are used by the text extractor of the invention to extract tabular data automatically from a batch of files containing similar tables.

Figure 6A:
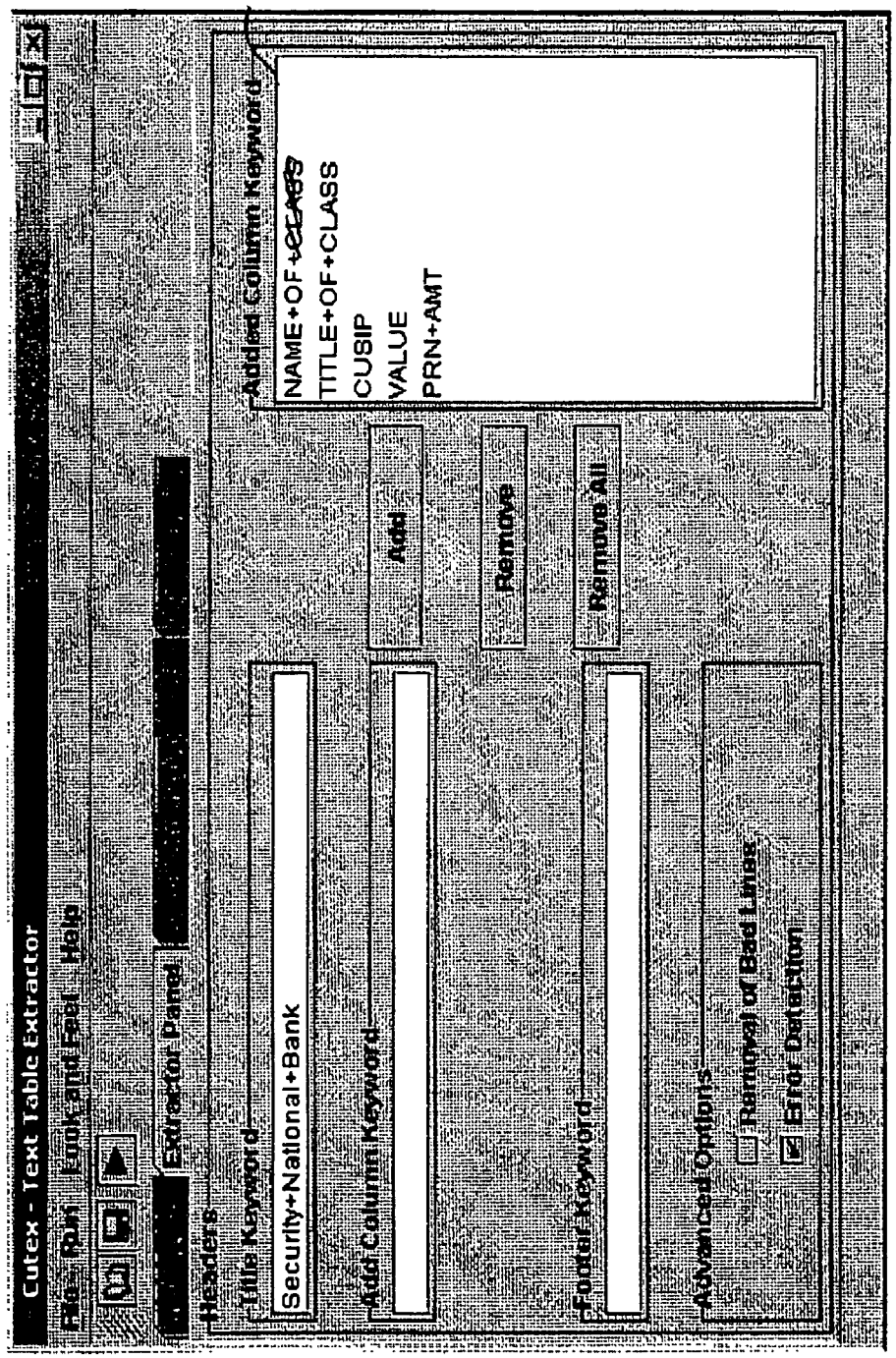
FIGS. 6a and 6b are screen shots illustrating the operation of a text extractor tool.
Figure 6B:
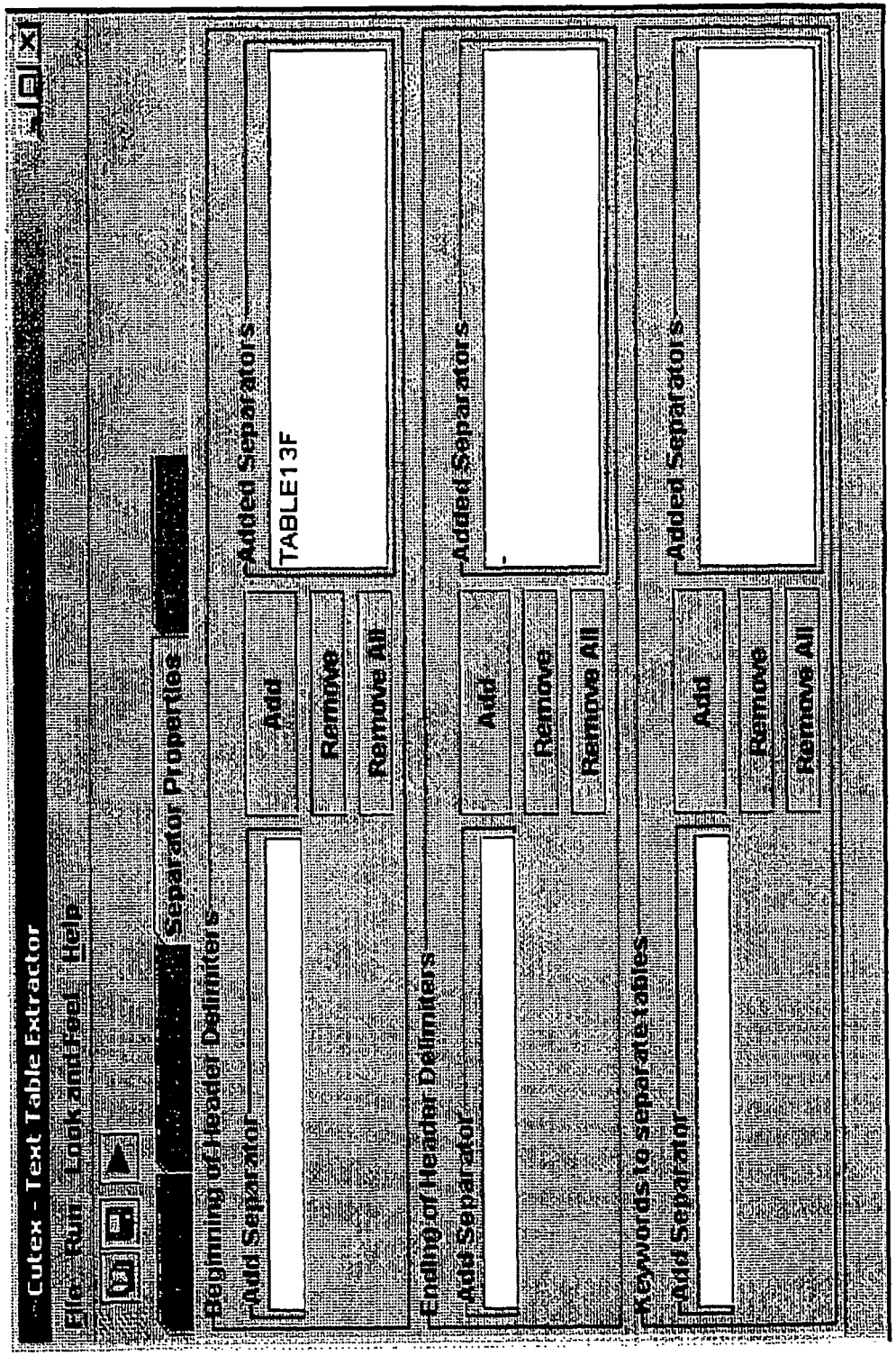

FIGS. 6a and 6b show part of the user interface of the text extractor of the invention. It can be seen that there are four tabbed panels, two of which (extractor panel and separator properties) are shown in FIGS. 6a and 6b. The other panels allow for selection of input and output files. Input files are text files in the form shown in FIG. 5, i.e. badly formatted.

After the input and output files have been selected and named, the extractor panel shown in FIG. 6a is used to provide a list of all the header names (column keywords) that could possibly occur across all the tables in the files. The header names can be either single words or phrases. Note that there is an option for removing bad (long) lines that span all of the columns, as well as an option for turning on error detection which then automatically separates all of the input files into two directories, one for correctly extracted tables and the other for all those where extraction failed.

In the separator panel shown in FIG. 6b, the user also provides a list of tokens that serve as separators between the column headers and the data. It also has input fields for tokens which serve as delimiters for the table (both at the top and at the bottom). This allows the text extractor tool to filter out text which is not part of the table.

The text extractor can automatically perform the extraction without any manual intervention. However, to increase the yield of correctly extracted tables, it is sometimes desirable to supply the minimum column gap as a parameter. In this case, the system is used interactively by the user to sample a few text tables to estimate this gap. The clustering algorithm will not merge adjacent clusters if the gap between them is larger than this parameter value.

After running the system and performing extraction over a collection of text tables, the user can examine the directory containing incorrectly extracted tables, sample a few of them, identify and determine whether the incorrectly extraction was caused by an erroneous estimate of minimum column gap, re-adjust the configuration parameter, and begin a new run on all these tables.

FIG. 7 illustrates an output (in MS Excel format) generated by the text extractor for the table illustrated in FIG. 5. The present embodiment of the text extractor can generate output in several formats including bar-separated, MS Excel and MS Access.

As mentioned above, the tools of the invention also include an ontology management system (OMS), an ontology directed classifier (ODC), and an ontology directed extractor (ODE). The OMS manages a highly structured knowledge base which indicates hierarchies of classes where classes have properties that are given as relationships to other classes (ontologies). Here the terms properties, attributes and relationships are used interchangeably. The ODC uses the hierarchy of classes, e.g. a taxonomy such as the UNSPSC (United Nations Standard Products and Services Code) or the NAICS (North American Industry Classification System). The ODE uses the properties of the hierarchy of classes to extract attribute-value pairs from free flowing text.

Referring now in more detail to the OMS, it is currently implemented in XSB Prolog and provides an efficient way of storing and managing classes and their relationships, as well as objects and their attributes. The OMS provides a structure to represent knowledge. The knowledge is represented as a set of objects, a particular collection of sets of those objects, relations among these sets and objects, and constraints on those relations.

For example, the UNSPSC taxonomy is a classification system to guide global commerce. It is a 8 digit hierarchical schema consisting of 4 levels in the hierarchy, plus an additional 2-digits (9/10 position) that are optional. It enables users to consistently classify the products and services they buy and sell.

Figure 8:
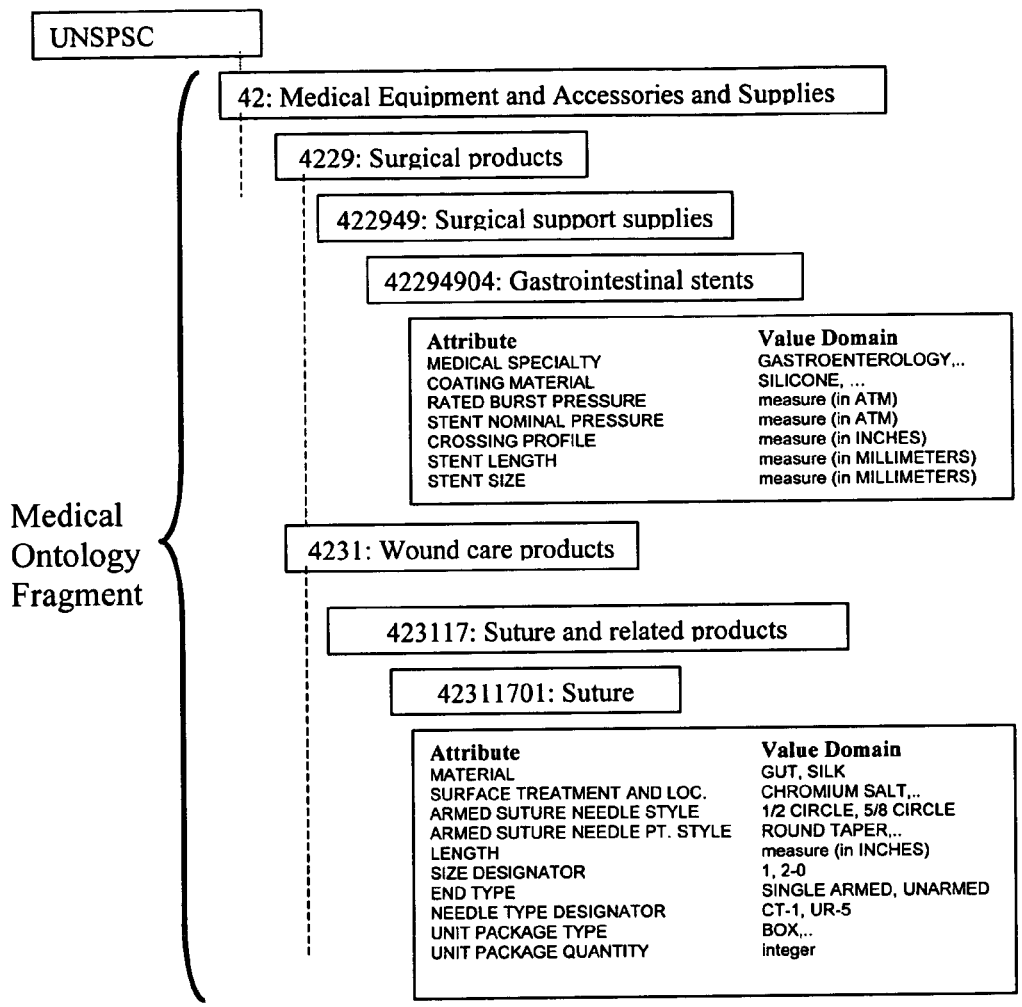
FIG. 8 is a fragment of a taxonomy as used in the ontology management system.

The UNSPSC has approximately 50 main classes. One of these classes is "42: Medical Equipment and Accessories and Supplies" A fragment of this class and some subclasses is illustrated in FIG. 8. This class of medical equipment is subdivided into 20 subclasses, one of which is "4231: Wound Care Products". The Wound Care Product class has 10 subclasses, one of which is "423117: Suture and related products", which in turn has 8 subclasses, one of which is "42311701: Sutures". In a slightly simplified example, this hierarchy is represented in the OMS using a class relation, containing:

Class(4231, 'Wound Care Products').
And a direct_subclass relation, containing:
Direct_subclass(42311701, 423117).

Representation of complex real-world problems requires more than just taxonomic information. For example it is not enough just to know that an item is a suture; it is important to know details about the suture, such as whether it is absorbable or not, what kind of needle it has, its length, etc. To represent this kind of information the OMS supports the specification of attributes (or relationships) associated with classes. For example, the 42311701: Suture class may have these attributes: Material, Surface Treatment, Needle Style, Needle Type Designator, etc. According to the invention, each attribute must take its value from an appropriate domain. For example, the Material attribute of sutures may have 'GUT' and 'SILK' as its domain of values. The values that are appropriate for a particular attribute are themselves a class, and appear in the OMS as a class. Note that the value domains shown in FIG. 8 are not necessarily complete and only illustrate the first one or more values in the value domain. Attributes are generally pre-defined by an imported ontology, but can be defined by the user through a manual process. An OMS relationship connects the attributes of a particular class with the value domains appropriate for the attributes. For example: relationship('Sutures', 'Material', 'Suture Materials').

In addition to containing information on classes, an OMS contains information about objects, that are members of the classes. An OMS according to this example may have information about a particular suture, say procurement item 12345, described by "SUTURE ABS SURG SZ 3-0 4.50" LG GUT UNARMED MED TREATED STER 12S". This is an object and information about it is stored in the OMS in an object relation, object(12345, 'procured object'). The class in the OMS to which it belongs is represented in a direct_memberof relation, e.g., direct_memberof(12345, 42311701), indicating that this object is a member of the class of Sutures. Attributes of particular objects (consistent with the attribute types declared in the relationship facts) are represented in the OMS using the attribute relation, as in: attribute(12345, 'Material', 'Gut').

Rules are given to define a "memberof" relation, which is transitive through classes, which would imply, for example, that object 12345 is a member of the class of Wound Care Products. Rules are also provided to support inheritance of attributes (when the attribute is declared to be inheritable.)

The OMS supports primitive classes, including character strings, integers, and floating point numbers. It also supports parameterized classes, represented by terms, and representing semantically the cross product of a set of more basic classes. Inheritance is also supported through parameterized classes. In addition, the OMS supports a primitive data type of "clause", which allows rules to be saved in the OMS.

The OMS has strong similarities to other systems for managing object-oriented knowledge such as Flora, RDF and Protege. However the OMS differs from these systems in that it can easily convert between Prolog and database syntax. In addition, the OMS does not have a constraint that a given attribute is unique or functional. Finally, the OMS does not provide for non-monotonic inheritance of relationship facts for default reasoning. These differences make the OMS more efficient and easier to use in commercial systems.

A taxonomy determines an organization for a set of objects. For example, given a particular partially known product, the first step in relating it to the known products is to determine what class in the UNSPSC taxonomy it should be placed in; or more precisely, it should determine all classes in the UNSPSC taxonomy of which it is a member. Given a taxonomy and a short description of an object believed to belong to that taxonomy, the ODC finds the nodes in the taxonomy containing that object. Even if the exact smallest class of which it is a member cannot be determined, the ODC may be able to determine some set of classes of which it is likely to be a member. Since every class in the taxonomy is a subset of the class above it, such a set of classes will form a sub-tree of the taxonomy. A sub-tree is referred to as a "cone". The problem that the ODC solves, is to take an arbitrary taxonomy and an arbitrary description of an item covered by the taxonomy and produce a "cone" that is the best guess of where that item should be classified in the taxonomy. The following examples illustrate how the ODC works.

Example 1

A large company buys products from a great many suppliers. This company has a policy of trying to make at least 15% of all their purchases from minority suppliers. So whenever a company buyer is trying to find a supplier for a new need, the buyer is encouraged to try to find a minority supplier. However, finding a new supplier can be difficult.

To help in this process the ODC can classify all known minority suppliers to a standard taxonomy according to a description of supplier capabilities. There is a standardized taxonomy for classifying suppliers of parts and services, the NAICS taxonomy (North American Industry Classification System), which can help organize these minority suppliers. There are databases of minority suppliers in which they have self-classified themselves to NAICS categories. With this database, a buyer can go to the category of suppliers that supplies the product or service needed and contact suppliers classified there. However, there are over 2500 categories in the NAICS taxonomy, so finding the correct one(s) is a daunting task. By using the ODC, a buyer can enter a brief description of their need, and the classifier can return a relevant cone of the NAICS taxonomy, thereby greatly focusing the buyer's search.

Example 2

It is known that self-classification of the supplier to NAICS categories is a highly error prone practice. The ODC can be used to minimize or eliminate these errors. Suppliers can use the ODC when classifying their company's products and services. They can enter a description of their products and services and then choose the best matching description from the cone(s) that the ODC returns. In this way, the purchasers can obtain far more accurate data regarding suppliers.

Example 3

Another application of the ODC is what is known as "spend analysis". Given a taxonomy of products (such as UNSPSC), the ODC can be used to classify all products that a large company buys. Then products classified to the same category can be analyzed and compared to determine where most of the cost is incurred, and whether the best deals are always obtained for these similar products.

The ODC operates in several stages. The first is referred to as Taxonomy Token Weighting. Taxonomy descriptions are tokenized and super-tokens are created by applying replacements that are predetermined or have been entered by the user. This step may include elimination of certain tokens that are irrelevant for classification, such as the tokens "the", "a", etc. These super-tokens can be used to correct obvious misspellings, to account for common abbreviations, and so on. For each super-token T, the non-normalized weight of T is taken to be total occurrences of all super-tokens in the taxonomy divided by the total occurrences of T in the taxonomy. This weighting gives higher weight to tokens that occur less frequently in the taxonomy, and thus are likely to be more useful for classification.

The second stage is referred to as Node Weighting for Descriptions. The object description is super-tokenized, and a weight is derived for each node in the taxonomy as a function of the super-tokens in the description that match the nodes description, their position in the descriptions, and the co-occurrence of multiple tokens.

The third stage is referred to as Weight Propagation and Normalization. Given the semantics of taxonomies as being ordered by set-inclusion, the classification weight of a node N is taken to be the weight of N as determined in the second stage, together with the sum of the weights of all of its children. In this stage previous weights are propagated and then normalized so that the weight of the root of the taxonomy equals 1.

The fourth stage is referred to as Determining the "Best" Node and Cone. Based on the results of stage three, a search starts at the root and descends the tree to determine the "best" match for the object description based on the node's normalized match weight obtained in stage three. Users of the ODC may use various parameters to determine when the descent should stop along with various relaxations of the aggressiveness of the descent.

It can be shown that the normalized weights produced by stage three form a probability measure when the taxonomy graph is a tree.

ODC can be tuned in two basic ways. First, the classification algorithm is heavily dependant on the weights of super-tokens as determined in stage one. By tuning the super-tokenizer, which is applied both to taxonomy nodes and to object descriptions, the various weights of nodes can be affected. Second, training items can be provided. These are descriptions that are pre-classified to their correct taxonomy node.

Training items are treated as if they extended the taxonomy, being taxonomy nodes that are immediate children of the node in which they are properly classified. Then the processing proceeds on this "larger" taxonomy. The only difference in treatment is that in stage four, when the best node is determined, these new training items are excluded from being chosen. So training descriptions "pull" similar descriptions toward themselves.

As may be appreciated from the description of the ODC above, the ODC has several components. The lowest-level component of ODC is called the super-tokenizer. It reads the input descriptions (of a taxonomy node or of an item description) and applies user-specified rules to construct the "words" used for matching items with nodes. The super-tokenizer handles simple user-specified abbreviations, but also supports more complex standardization of units of measure, or number range mappings. It includes a fully recursive rewriting system. The output of the super-tokenizer is a set of "words" and their associated weights. At this point in the process, the weights depend only on the location of the word in the input string. This allows the classifier (under user control) to increase the weight of words at the beginning (or the end) of the description. The inventors have found that a more accurate classification of short descriptions is often possible by weighting early-appearing words higher than later-appearing words.

The second component of the ODC utilizes the results of the super-tokenizer to build weight tables for all words appearing in the taxonomy node descriptions. Words are weighted based on the frequency of their occurrence and their location in the taxonomy. When it is given a description string, the ODC uses the weight tables to determine a weight for each node in the taxonomy, the weight indicating a confidence of that taxonomy node being the correct node for the description. The weights are standardized and accumulated, and then used to determine an optimal cone for the description. The width and depth of the cone are controllable by parameters set by the user.

The final component of the ODC is a graphical user interface (GUI) that allows a user to load a taxonomy, load descriptions to classify, optionally load pre-classified training descriptions, tune the classifier with abbreviations and more training items, classify descriptions and view the resulting cones and weights. It also supports manual correction of misclassified items and the exporting of classified batches of data.

The classification subsystem is coded in XSB (an extension of Prolog) code, and the user interface is implemented in a proprietary interface generation system called XJ, which is implemented in Java. XSB and XJ communicate using an open-source subsystem, called InterProlog.

The super-tokenizer has been designed and built to efficiently support a very large number of complex replacements using trie-indexing. In addition, the compact code of the XSB language allows larger data sets to be stored in memory. The open source semantic dictionary, WordNet, has been used to generate some replacements to allow the classifier to incorporate semantic information.

Figure 9:
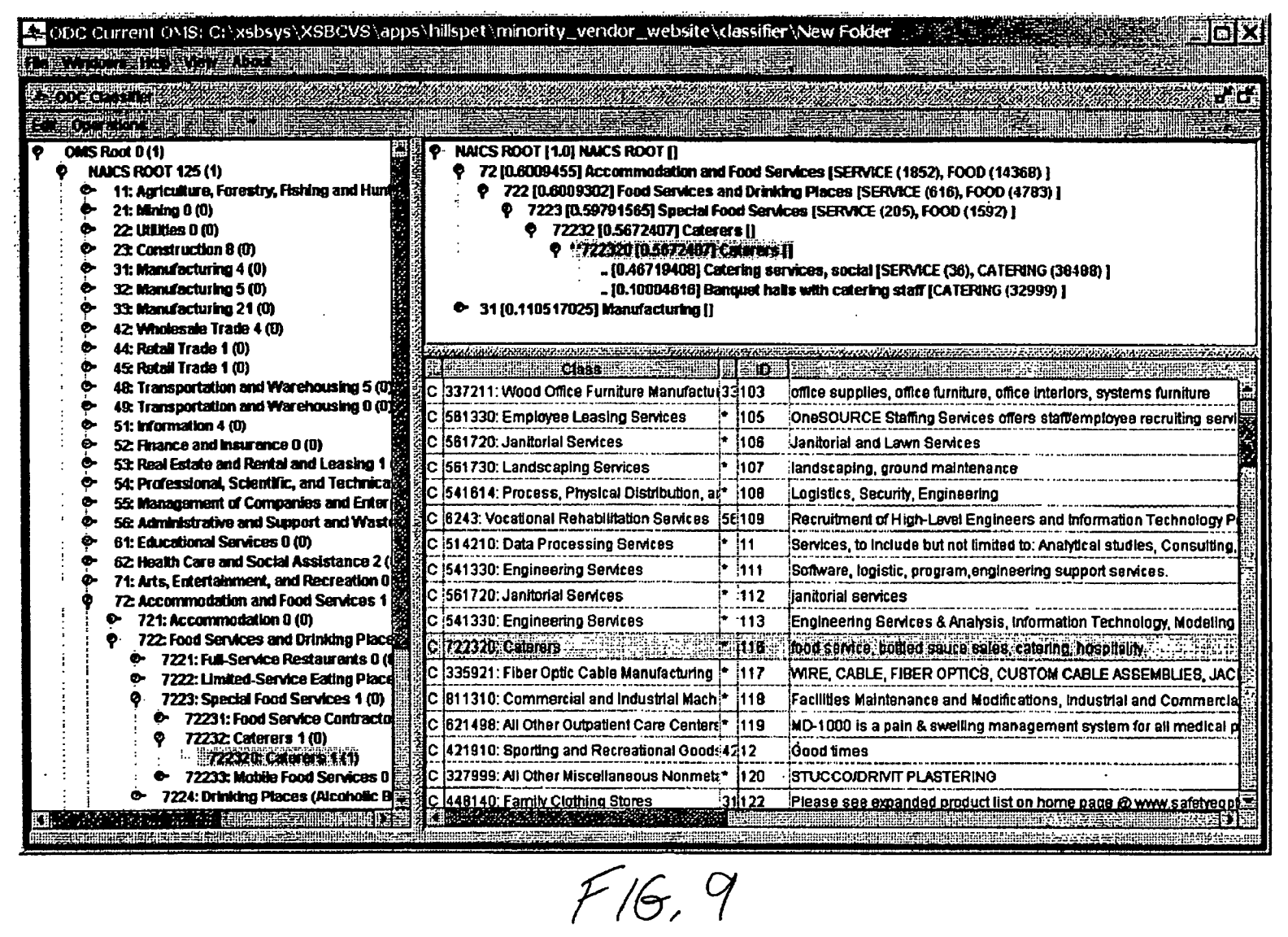

FIG. 9 shows a screen shot of the ODC in a typical use. The lower right panel shows a list of descriptions automatically classified to nodes in the NAICS taxonomy. Highlighted is a description "food service, bottled sauce sales, catering, hospitality" which was automatically classified to the "caterers" node. The upper right panel shows an explanation of the classification, displaying the computed cone, a sub-tree of the NAICS taxonomy. The numbers in the square brackets at the beginning of the node labels provide the "confidence" that the node is correct for the selected goods and services. The words in square brackets at the end of the node labels provide the words that match and their relative contribution to the confidence.

The ODE is used to extract attribute-value pairs from unstructured textual descriptions. For example, suppliers typically store product descriptions in a single "description" field of a table or a database or a simple text list such as: "SUTURE ABS SURG SZ 3-0 4.50" LG GUT UNARMED MED TREATED STER 12S". Such descriptions make aggregation and parametric searches for equivalent items very difficult due to the fact that different suppliers use different features and vocabularies to describe similar items. Ontology Directed Extraction (ODE) enables automated extraction of standardized features and values such as:

ITEM_TYPE="SUTURE, ABSORBABLE, SURGICAL", END_TYPE="UNARMED", MATERIAL="GUT", SURFACE_TREATMENT="CHROMMSALT", SIZE="3-0", LENGTH="4.50INCHES", STERILITY="STERILE" AND PACKAGE_INFO="12S"

A great deal of information is available in the form of natural language descriptions which are very difficult to reason about using automated tools. For example, it is very difficult to program an automated tool to determine whether <Silk Suture, 2-0, 18", FS> and <Nonabsorbable 18 inch 2.0 Suture> are equivalent. Although both of them are classified as sutures, that does not necessarily mean that their properties are the same. The extraction process can be viewed as an OMS transformation in which the extractor looks through attribute-value pairs of objects containing their natural language description and then populates other attribute-value pairs for the objects. Having extracted those attribute-value pairs, it is then possible to export them to a database table and run queries on them, have another application that makes use of them, or store them in the OMS. For example, from the description above the extractor determines: Material—Silk, Size Designator—2-0, length—18 inches, Needle Type Designator—FS, and even infers that the Type is Nonabsorbable (as all Silk sutures are nonabsorbable).

It is important to know what class the object belongs to before running it through the extractor, as different classes in ontology have different attributes, and the extractor needs to know what attributes are valid for the description. For example, from the description RED LEAD the extractor would extract Lead Polarity (Positive) if the object were classified in Electrical Devices. However, if the object is in a paint class, the extractor would determine paint color (Red) and chemical base (Lead).

The goal of the ODE is to make it possible for domain experts, not computer technologists, to create extractor programs that extract attribute-value pairs from unstructured descriptive text. For this, it is necessary to specify "parameters" to a generic extractor, and provide easy ways for the domain expert to specify these parameters.

The parameters include an ontology (e.g. FIG. 8) which contains information about classes of objects and their properties and types of values. The ontology also contains information about abbreviations and special word usages, their contexts of use, and preferences. The other extractor parameter is a set of pattern rules, that provide information about how non-enumerated values for attributes can appear in text input. These declarations provide information about how attribute values can appear in text input.

The present ODE is built on the XSB tabled logic programming engine, whose powerful grammar and unification capabilities make it an excellent platform for this kind of processing.

To create an ODE extractor, a domain expert must create (or refine) the ontology (adding new types, if necessary.) The present invention provides an example-based easy-to-use tool that a domain expert can use for constructing extractors.

Figure 10:
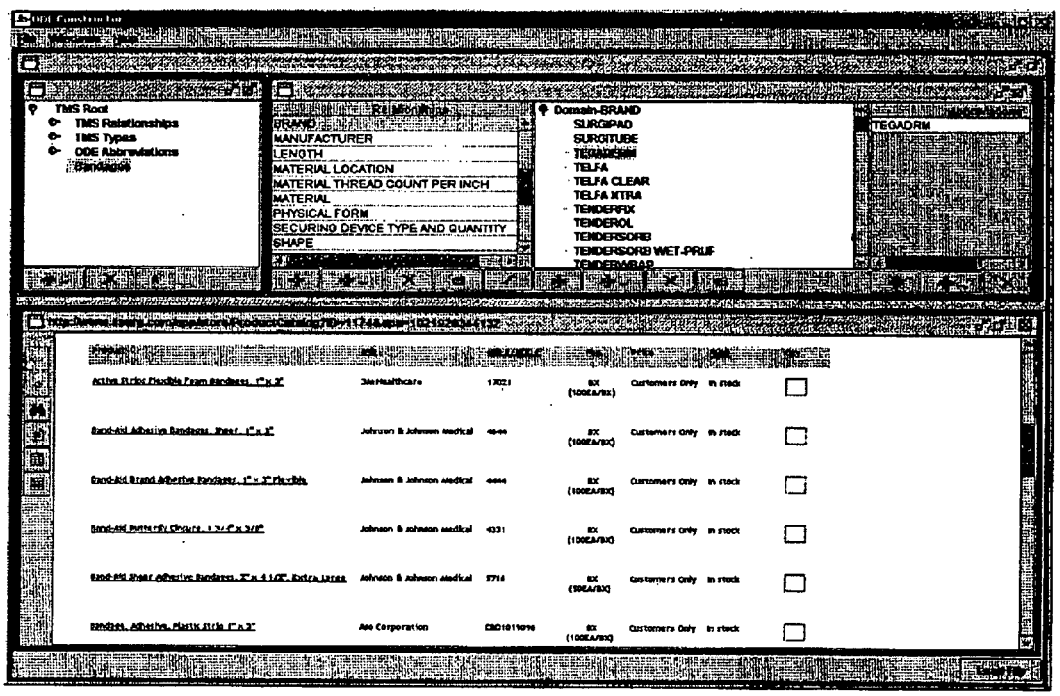
FIGS. 10 and 11 are screen shots illustrating the construction of an ontology directed extractor.
Figure 11:
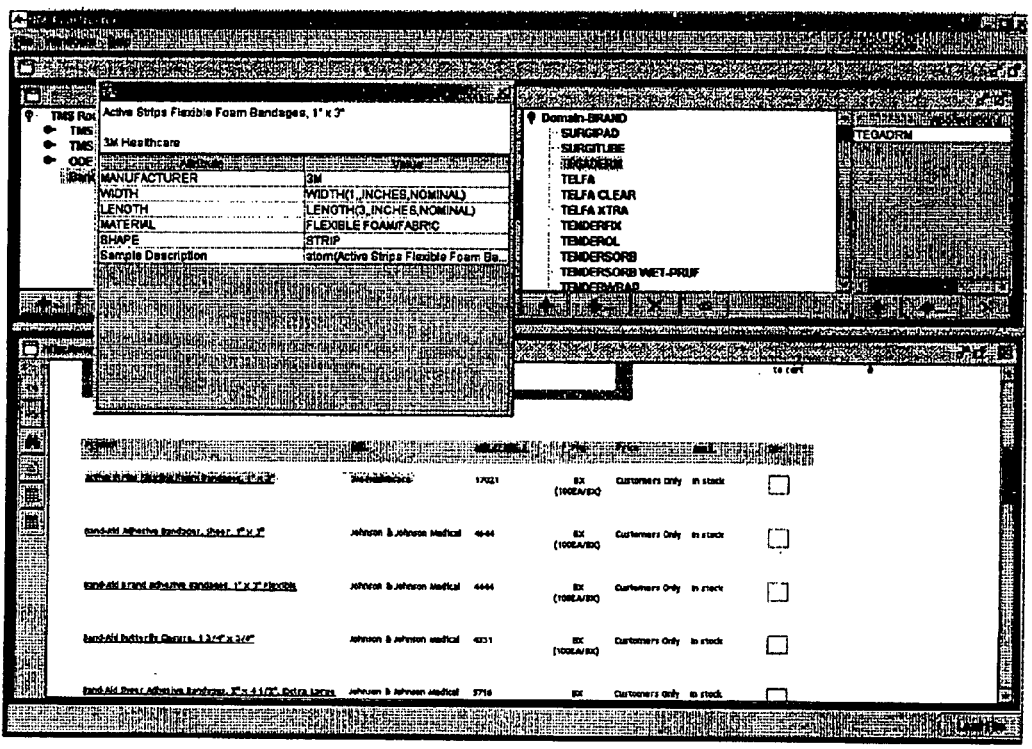
Figure 12:
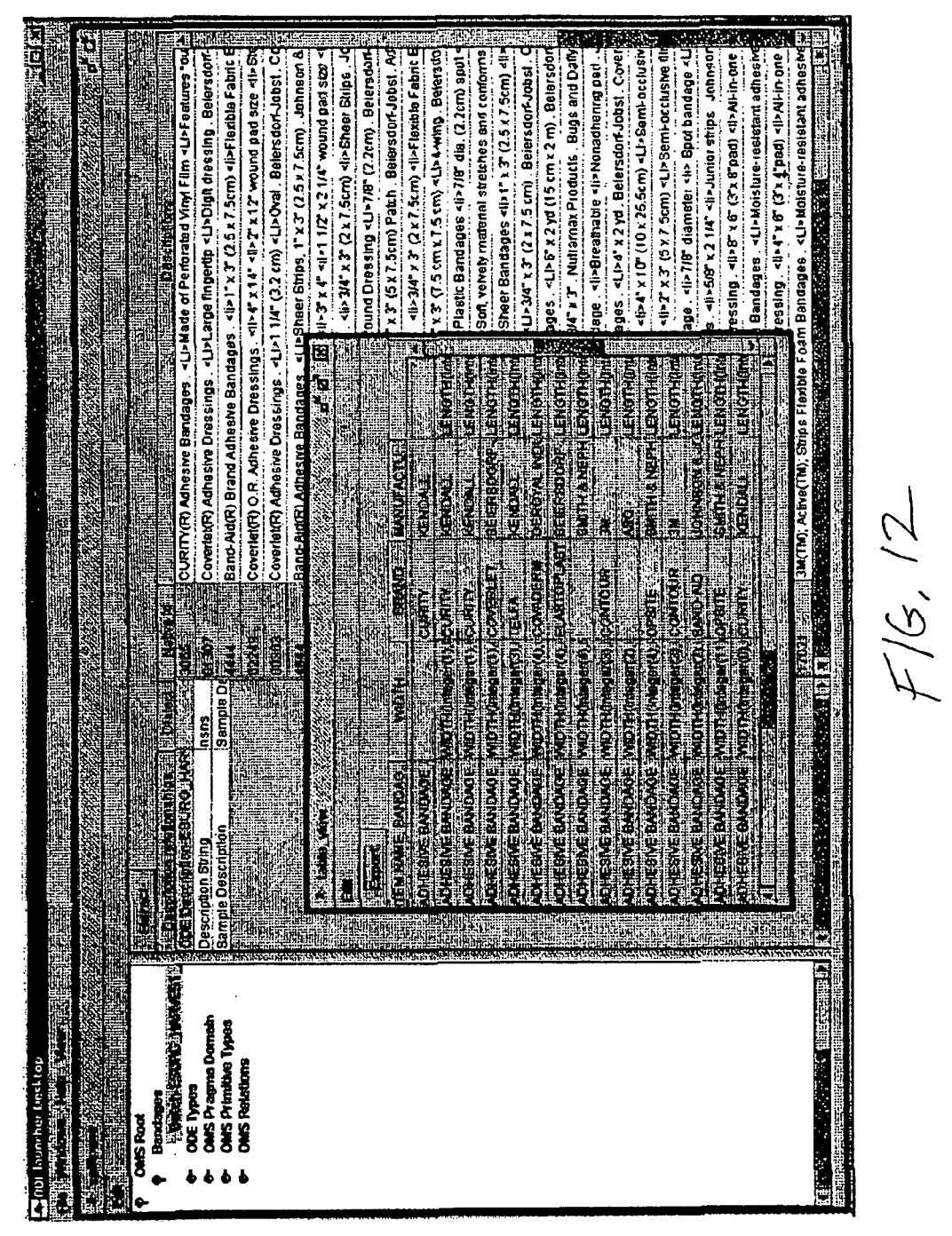
Figure 13:
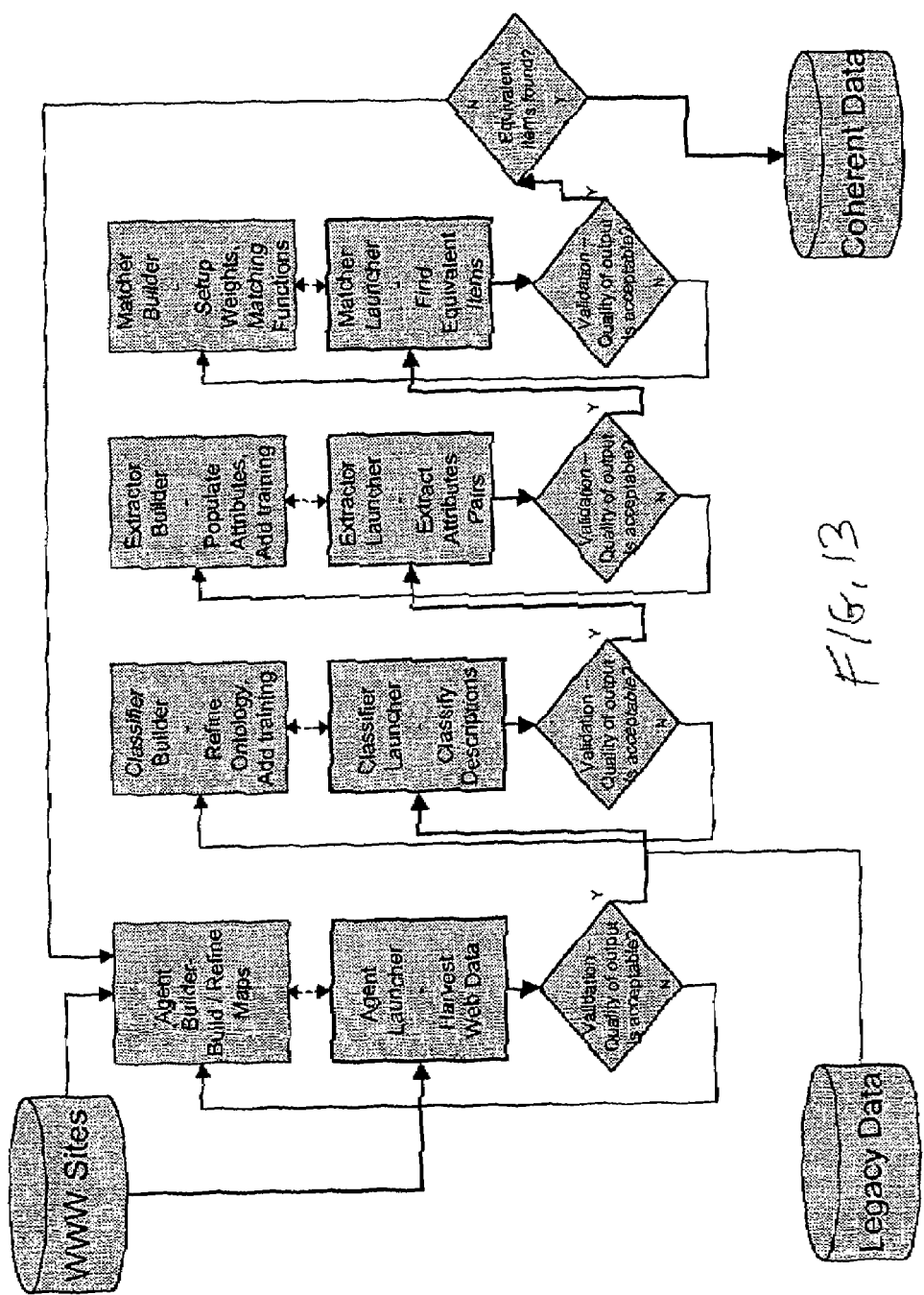
FIG. 13 is a simplified flow chart illustrating how all of the tools of the invention function together.

From the foregoing it will be appreciated that the ODE has two main parts, the ODE Constructor and the ODE Launcher (or ODE Extractor Builder as referenced in FIG. 13). The ODE Constructor allows the user to easily train a generic extractor by populating ontology knowledge about classes and the ODE Launcher applies that knowledge to the batches of pre-classified objects to extract their attribute-value information from descriptions. Both of these parts are built on top of the ODE engine, making use of a scanner, an efficient super-tokenizer and simple grammar. FIGS. 10 and 11 illustrate the ODE Constructor GUI and FIG. 12 illustrates the ODE Launcher.

Operation of the ODE is illustrated by the following example. To perform an extraction, the user must first build the extractor knowledge base with the ODE Constructor by supplying relations for the class and their domains, as well abbreviations and other fine tuning information, all of which is stored in the OMS.

Next, the user runs the set of descriptions (that have been previously classified using the Classifier) through the ODE Launcher (using the previously built OMS) and the launcher extracts values of attributes from those descriptions. The process is iterative, if the user is not satisfied with the results he may continue adding extractor knowledge until he is satisfied with the results. The process is also repeatable, as the knowledge built can be used later with descriptions from different sources providing that they are classified to classes for which the extractor is built. Note that this may require some additional abbreviations and values if the data is substantially different. However, there is a finite number of ways that data can be presented in a text and generally, an extractor trained to work on descriptions from several diverse sources will extract most of the information from the descriptions of some new data source as well.

The ODE Constructor allows the user to create an extractor for classes in an ontology, add relationships representing the properties that the given class might have, and add domain information for the relationships. It also allows the user to add abbreviations and replacement rules with a simple GUI interface. The ODE also provides ontology editing capabilities for a domain expert to use. To that end, the ODE Constructor has a training area section that allows the user to load Text, HTML, and MS Access or Excel tables and add values to the ontology by selecting text in the training area and pressing the Value button (+) in the "Domain Type" window or as Add as abbreviation (+) in the abbreviation window. In addition, the user has the capability of checking whether the information has been correctly added by selecting some sample text and prompting the constructor to perform extraction on that text. This shows the user which attribute-value pairs can be extracted from the selected description. The user can also request to see what parts of the selected text do not contain any values according to the extractor's current base of knowledge. This helps the user test the extractor without running the whole description batch through the ODE Launcher.

Value domains for attribute-value relationships are divided into two types—Enumerated and Parameterized. Enumerated domains represent a finite set of acceptable values. For example, the domain of Strand Fiber Arrangement for a Suture is an enumerated domain with values Braided, Monofilament, Multifilament and Twisted. However, the domain of suture length is a measure (which is a number with an associated unit such as 2.5 meters) and it is difficult or impossible to name all the possible values it can take.

By default, when a user creates a new relationship for a class, a new Enumerated Domain is created for this relationship. For example, if the user selects a Suture class and adds Material as a relationship, a new Suture-Material-Domain is then created. The user can select this domain and add its possible values like Silk or Plastic by selecting those values in a sample text in the training area or by manually typing in the values. The values of the domain are presented in an ontology as subclasses of the domain class.

The ODE Constructor also allows users to create and edit Parameterized domains. Parameterized domains are fairly complex and as such, some of the most frequently used parameterized domains are provided for the user with the creation of the OMS; they are integer, number and measure. The user can select a relationship and choose an option of changing its domain type to an appropriate domain from the OMS tree. However, sometimes the user will be required to create a new complex, previously non-existent value domain. For example, Size Designator for Sutures is generally represented as: 2-0, 3-0 and so on. A user can create a new parameterized type that has two arguments (for 2 and 0) and add a replacement rule saying that if the extractor sees a pattern where an integer is followed by '-' (dash) followed by an integer, the ODE Constructor should take the first integer as the first argument and the second integer as the second argument. The process of creating a new domain is carried out in a convenient rule editor where the user does not have to manually type in the rule, rather, the user constructs the rule by selecting an integer concept in the list of available classes, adding -(dash), and picking the integer class again.

The user can have several rules of the same type to recognize the various patterns that may appear; for example, the user can add a rule to extract 2.0 as the Size Designator 2-0. That would be a similar rule with integer followed by '.'

(period) followed by integer. Such pattern recognizing rules allow the user to process a string, extract only the information that is desired and ignore the rest. For example, in a dimension 5 mm×4.5 mm, the first measure is length and the second is width for some domains. So in creating a rule for length, the user will pick measure, select that he is interested in all of its arguments (which are 'Sign', Number and 'Unit'), add 'X' and pick the second measure and select that he is not interested in arguments of the second measure. This would create an internal replacement, which would result in the ODE seeing a string like '5 mm×4.5 mm' and picking the first measure which is '5 mm' to be the value of the length property. Conditions may be specified in the rule editor to enforce that the first measure be length only if greater than the second measure.

Rules can be edited at any time should the user wish to change them or add new patterns to existing rules. In general, there is a limit to the number of ways a value can be present in a string, therefore, only a few rules or patterns need to be constructed to recognize values of a certain domain in a text.

The ODE Constructor also provides for abbreviations and simple word-to-word replacements. Sometimes strings in the text can be found in an abbreviated or modified form. To recognize these abbreviated strings the user needs to add abbreviation information to the OMS. To add an abbreviation for a value, the user can either select corresponding text in the training area or can manually type in the abbreviation. In addition, the user can add an abbreviation for a word that is a substring of a value, for example, abbreviation DBL for word DOUBLE which is a substring of the value Double-Armed. This is carried out within the framework of a convenient abbreviation-table editor. Abbreviations are contextualized, i.e. they can be applied for a description classified to a certain node and all its subclasses but not other nodes. For example, STR might mean Sterile in a medical domain and strength (of material) in a vehicle domain. By default, the context of an added abbreviation is the class for which extractor knowledge is being built.

The user can edit and select a higher or lower class in the ontology to be a context of an Abbreviation. Certain replacements that are not abbreviations but rather are inference rules may be added along with abbreviations. For example, if Silk is in the text for Suture the ODE can infer that the Suture Type is Non-absorbable. Some abbreviations that are used often and that apply to all classes are provided for the user when he creates a new OMS for the extractor.

In addition, the ODE Constructor provides for the concept of Dialect where the abbreviation occurs. Dialect represents the source of data specific for an abbreviation. For example, all descriptions coming from one web site might have S1 as an abbreviation for Absorbable suture, however that abbreviation may not apply to other sources. By default, an abbreviation will apply to all sources, but specific dialects can be specified by the user.

A Preferences feature allows the user to fine tune ODE to resolve any preferences. For example, if PLASTIC SURGERY is in the text we want to infer that Needle Design Designation is Plastic Surgery, not that the Material is Plastic. There is an easy preferences mechanism presented in the table of preferences for an Extractor Class (Suture in the example), where the user can add a preference to prefer Needle Design Designation over Material, providing that the string from which the former is extracted is longer then the string from which the latter is extracted.

Note that it is not necessarily desirable to set preferences for values of all domains. For example, if the ODE finds GAUZE BANDAGE it might be desirable to get both bandage type as Gauze Bandage and material Gauze (the Bandage type domain is not a repetition of the material domain though it includes the word 'gauze' here, other values for the type are Surgical Rubber Bandage, Elastic Bandage, Adhesive bandage). So in this case it is not necessary to add a preference and the extractor, by default, will extract all the possible values from the string (both the material and the type in this case).

There are two types of preferences that can be added to prefer one value over another when the first is extracted from a longer substring, or to have that preference when they are extracted from the same-length substring. For example, from the same string AC-25 both ID number and Needle Type Designator are extracted, however there can be a preference to prefer Needle Type Designator over ID number.

When the domain expert decides that the extractor is sufficiently trained, he/she can process a batch of descriptions with the extractor using the ODE Launcher. The descriptions may be initially processed through ODC to determine their class. The user can then run the extractor and extract attribute-value pairs for each of the descriptions using the ontology. The results of the extraction are stored in an OMS that can be saved for further manipulations and queries, or they can be exported to an MS Access table or to a delimited text file.

If the user gathers information from a Web site and knows its classification (for example, going to a web site that displays only Suture information), he can load the data directly into the ODE Launcher for the class with appropriate relationships.

After the extraction is complete, the user may review the results of the extraction, and if the results are not satisfactory, can continue refining the ontology by using the ODE Constructor in an attempt to obtain more precise extraction results.

As shown in FIG. 10, the main ODE constructor display window is divided into two sections—the upper panel, and the lower panel. The upper panel displays existing knowledge about classes and their properties in the form of an ontology, while the lower panel is used to load examples and training data into ODE. Within the upper panel there are four separate windows; the first of these (upper left) is the class window in which the user can see what OMS or Ontology they are working with and where they will be able to view a tree showing all of the classes needed for extractor construction. The second window is the Relationships window. This window displays information regarding the Relationships or Attributes of the selected class in the ontology the user is working with. The third window is the Values window. This window displays all of the information or values correlating to the Attribute selected in the Relationships window. Finally, the forth window is the Abbreviations window, which displays all of the possible abbreviations that the ODE will recognize for the selected Values in the third window.

The lower panel training area is where the user loads sample files (Text, HTML, MS Excel or MS Access tables) containing example descriptions (e.g. the Bandages domain in FIG. 10). It is not necessary to have such a file loaded. However it is useful for reference and may serve to increase the ease and speed of the extractor creation process. To load a Web page, text, Access or Excel table in the training area the user presses the Load File button on the bottom-right corner of the screen.

At any point during the process of building an ontology, the user can select a description in the training area text and press the Extract Attributes button (which is the first of two buttons with a table illustration located on the vertical tool bar running along the left side in the training-text area). At that point, extraction is performed on the highlighted description and the results in the form of the extracted attribute-value pair table is displayed for the user's review as illustrated in FIG. 11. This aids the user by allowing him/her to see whether all of the values were extracted correctly and what values or domains need to be added or refined without requiring the user to process the entire batch of items through the ODE launcher. The user also has the capability of viewing what parts of the text did not provide any useful information for the extractor, and can then evaluate whether they contain interesting values. To do this, the user selects the show non-extracted substrings button (the second button on the tool bar) which populates a table displaying the pieces of text that were not used in the extraction process.

If the user wants to create an ontology anew, he can start by loading an existing taxonomy that contains the Bandages class or can create a new class (Bandages) by clicking on the root of the new taxonomy then selecting the + . . . button under the class tree and entering the name of the new class. Then the user can enter relationships and corresponding domains of possible values. Looking at the sample text in the training area may help the user to understand the values of which properties are mentioned for the domain. For example, for Bandages the user sees that material and dimension are in the text and would want to extract those. For the material attribute, the user creates a Material relationship (property) by clicking the + . . . button in the section under the properties header and typing in the new Relationship name (Material). A new relationship Material is thus created with the corresponding domain of values Domain-Bandages-Material. However that domain is empty and the user must supply possible values for that domain. In this example, those values would be Plastic, Rubber, Flexible Foam, etc. To add the values, the user presses the + . . . button in the domain section and types in a value for the Domain-Bandages-Material. Alternatively, the user can select such a value in the training text and press the + . . . button (located in the domain section third window) that will add a selected text as a value of the domain. After some values have been added, the user can add abbreviations for those values. That is done by selecting a value (for example, Rubber) and pressing + . . . button in the abbreviation section and typing in the abbreviation (for example, Rbbr).

The user can check whether the added values are extracted correctly. For example selecting 'Active Strips Flexible Foam Bandages, 1"×3"' text and pressing the Extract Attributes button displays the Material—Flexible Foam entry in the extracted attributes table. By adding relationships and values in this manner, the user can build the extractor trained for Enumerated domains.

The user can load domain values from a text file and avoid some of the burden of building domains. This is done by clicking on the load file button and selecting the file and the proper file delimiter. Thus, the user can load predefined values if they are available.

For values such as Width and Length to be extracted from descriptions like 1"×3", parameterized domains need to be created or selected from existing ones (like measure in this case). The user can create and select the appropriate relationship (for example Length) in the relationships panel, right click on it and choose the 'Change domain to measure' option. Then a pattern rule can be added specifying that if measure is followed by measure then the second one (or first one) is length. In a similar way, the user can also create a new parameterized domain if there is no appropriate one in the ontology. Additionally, the user can also specify a condition in the pattern rule by showing that in the pattern the first measure is less than, or equal to, the second measure.

The ODE constructor also allows the user to save the ontology at any point and load it again for further processing at a later time.

After an extractor is built with the ODE Constructor, it is ready to be deployed for extracting attribute-value information from a batch of objects containing text descriptions. Extraction in the ODE Constructor is only done on a small set of descriptions to help populate the extractor knowledge base; extraction on large amounts of data is performed using the ODE Launcher. This simplifies the process of extracting attribute-value information from a batch of descriptions using the extractor knowledge-base populated by the ODE Constructor. A screen shot of the ODE Launcher is shown in FIG. 12.

Once the user loads the ontology into the ODE Launcher, an item can be classified to a node in this ontology by the classifier. Using attribute information about this class from the ontology the extractor extracts all the attributes appropriate for that class from the item description. It is also possible to import objects with their descriptions from text files if the user already knows that the descriptions in those files are related to some extractor class, i.e. it has been pre-classified. For example, if the user obtained descriptions from a web site describing bandages, he can load them directly as objects of the Bandages class and can extract attribute values from bandage descriptions.

FIG. 12 shows extraction from descriptions of a batch of Bandage objects. The results are displayed in table form and can be exported to an Access table or a delimited text file or kept in OMS for further processing.

Although the invention is designed as a process that will perform end-to-end extraction in an automated fashion, it is desirable to be able to assess and measure the quality of the extraction performed. Based on the quality assessment, the user can fine-tune the system parameters appropriately. The invention includes a validation methodology to statistically sample extracted data and compare it to original data from the source in order to assess the quality of the extraction. In one embodiment the statistical sampling techniques were based on a well known quality measurement standard which defines an Acceptable Quality Level (AQL). According to a more recent embodiment the techniques are based on ANSI/ASQC Z1.4-1993 which defines an Acceptable Quality Level (AQL). AQL is defined as the number of defects per 100 items produced. For example, in the context of attribute extraction from unstructured product data descriptions, AQL indicates the number of erroneously extracted attributes per 100 records, each consisting of one product description. The procedure defined in ANSI/ASQC Z1.4 is to choose a random sample from a production run based on the size of the run. This sample is inspected for defects. To achieve a certain AQL, the sample can have at most a certain number of defects.

The methodology for assigning AQLs according to the invention proceeds as follows. A random sample for a given extraction run is selected based on ANSI/ASQC Z1.4 tables. An initial AQL is selected and the sample is inspected manually. If an acceptable level of defects are found, another random sample is obtained and a lower AQL is selected. This process continues until a sample with too many defects for the chosen AQL is found. The last successful AQL is taken to be the correct AQL for the extraction run. If, on the other hand, the initial sample fails, another random sample is obtained and a higher AQL is selected. The process continues in this way until a sample succeeds and the chosen AQL for the successful sample is taken to be the correct AQL for the extraction run.

FIG. 13 is a simplified flow chart giving an overview of the operations of each of the parts of the invention. Turning now to FIG. 13, the user utilizes the agent builder to provide examples of target information to be extracted from a web site. The agent builder generates an agent map, which is used by the agent manager to harvest the desired data from the specified web site. Upon harvesting, this information is evaluated by the agent validator to assure that the map has correctly, and completely, specified the location of the target data. If not, the map is edited and refined by the agent builder. If AQL is achieved, the harvested data is then classified in the ODC. The ODC was initially trained for a specific domain of interest in the Classifier Builder. The Classifier launcher assigns the best class to each of the object (item) descriptions. The process us then validated, and if the desired AQL is achieved, the data is then passed to the ODE component. If the desired AQL is not achieved, the ODC is re-trained to improve upon classification results. In ODE, attribute-value pairs corresponding to a class of an object with a description are being extracted. For each ontology, information, along with abbreviations, and replacement rules are being supplied by the extractor builder. The Extractor launcher invokes the ODE logic engine to use ontology specific information to extract attribute-value pairs from object descriptions. Results are then validated and the extractor builder is used again should additional fine tuning and editing of the extractors be required. When data is structured in an ontology, a form matcher might be used to reason about the data and to determine product equivalence (similarity of content). The process may have to go through several iterations if it is determined (through the validation process) that the existing data is incomplete and information needs to be extracted from the WWW.

There have been described and illustrated herein methods and software tools for acquiring data from diverse sources and organizing the data in a form that may be used by a database. While particular embodiments of the invention have been described, it is not intended that the invention be limited thereto, as it is intended that the invention be as broad in scope as the art will allow and that the specification be read likewise. For example, the taxonomies and ontologies discussed herein are simply used as an example. The invention can be applied to any taxonomy and ontology. It will therefore be appreciated by those skilled in the art that yet other modifications could be made to the provided invention without deviating from its spirit and scope as so claimed.

The invention claimed is:

1. A collection of software tools embodied on a tangible computer readable medium coupled to a processor for acquiring unstructured data from diverse sources and structuring the data and/or determining similarity of content for the purpose of product information management, said collection comprising:

two or more tools selected from the group consisting of a web agent creator having means for creating a web agent to seek out and acquire product information on the world wide web, a web agent created by the web agent creator, the web agent having means for acquiring product information from the world wide web, a web agent manager having means for managing said web agent, an ontology-directed classifier having means for classifying product information, an ontology-directed extractor having means for extracting product information from content contained in unstructured textual product descriptions, and an ontology-directed matcher having means for matching product information extracted by the extractor through matching product categories and attributes, the tools providing a tangible result selected from the group consisting of a web agent having means for acquiring product information from the world wide web, classified product information, product information extracted from content contained in unstructured textual product descriptions, and information matched with product categories and attributes.

2. The collection according to claim 1, wherein:
one or more of the tools are example driven through a graphical user interface.

3. The collection according to claim 1, wherein:
said web agent creator has a web browser interface and a web agent is created by navigating to a web page of interest and selecting the kind of information to be extracted from the web page.

4. The collection according to claim 1, wherein:
the ontology directed classifier uses a taxonomy provided by a tree of classes and subclasses generated using an ontology management system.

5. The collection according to claim 1, wherein:
said ontology directed extractor takes unstructured text descriptions about an item as input and produces a set of structured property values about the item as output.

6. The collection according to claim 1, further comprising:
a validation method applied to one or more tools in the collection to determine the accuracy of the tool's output by manually checking the accuracy of a statistical sampling of tool output from specific tool input.

7. The collection according to claim 4, wherein:
the ontology directed classifier performs taxonomy token weighting, node weighting for descriptions, weight propagation and normalizations, and determining the best class and subtree of said taxonomy to which an item can be classified.

8. The collection according to claim 6, wherein:
said validation method determines an Acceptable Quality Level (AQL) as defined in standard ANSI/ASQC Z1.4-1993 by performing multiple sampling procedures at different AQLs as defined in said standard until the boundary AQL level is found below which the sampling procedure fails and above which the sampling procedure succeeds.

9. A collection of software tools embodied on a tangible computer readable medium coupled to a processor for acquiring data from diverse sources and/or structuring the data and/or determining similarity of content for the purpose of product information management, said collection comprising:

two or more tools selected from the group consisting of a web agent creator having means for creating a web agent to seek out and acquire product information on the world wide web, a web agent created by the web agent creator, the web agent having means for acquiring product information from the world wide web, a web agent manager having means for managing said web agent, an ontology-directed classifier having means for classifying product information, an ontology-directed extractor having means for extracting product information from content contained in unstructured textual product descriptions, and an ontology-directed matcher having means for matching product information extracted by the extractor through matching product categories and attributes, wherein said web agent creator includes
  a web browser user interface,
  a pattern expression discovery algorithm coupled to said user interface,
  a results editor coupled to said user interface and said pattern expression discovery algorithm,
  an agent generator coupled to said user interface and said results editor, and
  a form value editor coupled to said user interface and said agent generator,
  the tools providing a tangible result selected from the group consisting of a web agent having means for acquiring product information from the world wide web, classified product information, product information extracted from content contained in unstructured textual product descriptions, and information matched with product categories and attributes.

10. The collection of claim 9, wherein:
said user interface indicates text selected by the user interface to said pattern expression discovery algorithm, said results editor, said agent generator, and said form value editor.

11. The collection of claim 9, wherein:
said pattern expression discovery algorithm is an XPath discovery algorithm,
said user interface indicates a DOM tree of text selected by the user interface to said XPath discovery algorithm, said results editor, said agent generator, and said form value editor.

12. The collection of claim 10, wherein:
said pattern expression discovery algorithm generates a pattern expression based on the results received from the user interface and communicates that pattern expression to the results editor.

13. The collection of claim 11, wherein:
said XPath discovery algorithm generates an XPath based on the DOM tree received from the user interface and communicates that XPath to the results editor.

14. The collection of claim 12, wherein:
the results editor receives pattern expressions from the pattern expression discovery algorithm and accepts input from the user interface to identify the nature of the selected text.

15. The collection of claim 13, wherein:
the results editor receives XPath expressions from the XPath discovery algorithm and accepts input from the user interface to identify the nature of the selected text.

16. The collection of claim 13, wherein:
the form value editor receives input from the user interface and provides output to the agent generator including instructions and data to be used by the agent generated by the agent generator to fill out web based forms in order to reach the source of data to be extracted by the agent.

17. The collection of claim 16, wherein:
the pattern expression discovery algorithm takes as its input a set of items corresponding to the text highlighted by the user interface, identifies the items, and determines corresponding data extractor and isolator expressions.

18. The collection of claim 16, wherein:
the pattern expression discovery algorithm is an XPath discovery algorithm, the XPath discovery algorithm takes as its input a set of nodes corresponding to the text highlighted by the user interface, identifies locator nodes and grouping nodes based on the input set of nodes, and determines corresponding data extractor and isolator expressions.

19. The collection according to claim 17, wherein:
the corresponding data extractor and isolator expressions are used to form a navigation map to be used by the agent to find all nodes that match the isolator expression, and for each node matching the isolator expression, find a match for each of the data extractor expressions.

20. A web agent creator embodied on a tangible computer readable medium coupled to a processor for creating a web agent to acquire product information from the world wide web, said web agent creator comprising:
  a web browser user interface,
  a pattern expression discovery algorithm coupled to said user interface, said algorithm including means for discovering patterns of product information,
  a results editor coupled to said user interface and said pattern expression discovery algorithm, said results editor having means for editing product information,
  an agent generator coupled to said user interface and said results editor, said generator having means for generating said web agent having characteristics determined by said algorithm, and
  a form value editor coupled to said user interface and said agent generator, said form value editor having means for setting parameters of said web agent,
  said web agent creator providing the tangible result of a web agent executable on a processor which together acquire product information from the world wide web.

21. The web agent creator according to claim 20, wherein:
said user interface indicates text selected by the user interface to said pattern expression discovery algorithm, said results editor, said agent generator, and said form value editor.

22. The web agent creator according to claim 20, wherein:
said pattern expression discovery algorithm is an XPath discovery algorithm,
said user interface indicates a DOM tree of text selected by the user interface to said XPath discovery algorithm, said results editor, said agent generator, and said form value editor.

23. The web agent creator according to claim 20, wherein:
the results editor receives pattern expressions from the pattern expression discovery algorithm and accepts input from the user interface to identify the nature of the selected text.

24. The web agent creator according to claim 20, wherein:
the form value editor receives input from the user interface and provides output to the agent generator including instructions and data to be used by the agent generated by the agent generator to fill out web based forms in order to reach the source of data to be extracted by the agent.

25. The web agent creator according to claim 20, wherein:
the pattern expression discovery algorithm takes as its input a set of items corresponding to the text highlighted by the user interface, identifies the items, and determines corresponding data extractor and isolator expressions.

26. The web agent creator according to claim 20, wherein:
the pattern expression discovery algorithm is an XPath discovery algorithm, the XPath discovery algorithm takes as its input a set of nodes corresponding to the text highlighted by the user interface, identifies locator nodes and grouping nodes based on the input set of nodes, and determines corresponding data extractor and isolator expressions.

27. The web agent creator according to claim 21, wherein:
said pattern expression discovery algorithm generates a pattern expression based on the results received from the user interface and communicates that pattern expression to the results editor.

28. The web agent creator according to claim 22, wherein:
said XPath discovery algorithm generates an XPath based on the DOM tree received from the user interface and communicates that XPath to the results editor.

29. The web agent creator according to claim 22, wherein:
the results editor receives XPath expressions from the XPath discovery algorithm and accepts input from the user interface to identify the nature of the selected text.

30. The web agent creator according to claim 25, wherein
the corresponding data extractor and isolator expressions are used to form a navigation map to be used by the agent to find all nodes that match the isolator expression, and for each node matching the isolator expression, find a match for each of the data extractor expressions.

31. An ontology directed classifier embodied on a tangible computer readable medium coupled to a processor for use with an ontology management system including means for managing product information, said ontology directed classifier comprising:
    means for receiving a product information related taxonomy as input; and
    means for generating a tree of product information classes and subclasses as tangible output for use by the ontology management system to classify product information.

32. The ontology directed classifier according to claim 31, further comprising:
    means for taxonomy token weighting,
    means for node weighting for descriptors
    means for weight propagation and normalization, and
    means for determining the best class and sub-tree of said taxonomy to which an item can be classified.

33. An ontology directed matcher embodied on a tangible computer readable medium coupled to a processor for use with an ontology management system to match similar products using product attributes and their values, said ontology directed matcher comprising:
    means for describing products based on a structured set of properties;
    means for defining the relative importance of said properties in describing said products; and
    means for scoring the degree of equivalence of products based on said definitions,
    said matcher producing the tangible output of a listing of products paired with scores.

34. An ontology directed matcher according to claim 33, wherein:
    aid structured set of properties in defined by ontology attributes provided by the ontology management system.

35. An ontology directed matcher according to claim 34, wherein:
    said means for defining the relative importance of said properties is based on weight attached to a matching function for each said property that takes as input the values of said attributes defining that property for two different items and outputs a number indicating the similarity of these input values.

36. An ontology directed matcher according to claim 35, wherein:
    said means for scoring the degree of equivalence of items includes means for multiplying the said output values of all said matching functions by said respective weights and summing these products.

* * * * *